(12) United States Patent
Pace et al.

(10) Patent No.: US 10,838,490 B2
(45) Date of Patent: Nov. 17, 2020

(54) TRANSLATING COMBINATIONS OF USER GAZE DIRECTION AND PREDETERMINED FACIAL GESTURES INTO USER INPUT INSTRUCTIONS FOR NEAR-EYE-DISPLAY (NED) DEVICES

(71) Applicant: MICROSOFT TECHNOLOGY LICENSING, LLC, Redmond, WA (US)

(72) Inventors: Maria Esther Pace, Palo Alto, CA (US); Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/383,474

(22) Filed: Apr. 12, 2019

(65) Prior Publication Data

US 2020/0125165 A1    Apr. 23, 2020

Related U.S. Application Data

(63) Continuation-in-part of application No. 16/168,319, filed on Oct. 23, 2018.

(51) Int. Cl.
*G06F 3/01* (2006.01)
*G02B 27/00* (2006.01)

(52) U.S. Cl.
CPC ......... *G06F 3/013* (2013.01); *G02B 27/0093* (2013.01)

(58) Field of Classification Search
CPC ............................ G06F 3/013; G02B 27/0093
See application file for complete search history.

(56) References Cited

U.S. PATENT DOCUMENTS 7,091,928 B2    8/2006 Rajasingham
9,075,453 B2    7/2015 Bhaskar et al.
(Continued)

FOREIGN PATENT DOCUMENTS

EP          2893388 A1     7/2015
WO     2013168171 A1    11/2013
(Continued)

OTHER PUBLICATIONS

"Non Final Office Action Issued in U.S. Appl. No. 16/168,319", dated Oct. 17, 2019, 11 Pages.
(Continued)

*Primary Examiner* — Lisa S Landis
(74) *Attorney, Agent, or Firm* — Newport IP, LLC; Mike R. Cicero

(57) ABSTRACT

A Near-Eye-Display (NED) devices that translates combinations of user gaze direction and predetermined facial gestures into user input instructions. The NED device includes an eye tracking system and a display that renders computer-generated images within a user's field-of-view. The eye tracking system may continually track the user's eye movements with a high degree of accuracy to identify specific computer-generated images that a user is focused on. The eye tracking system may also identify various facial gestures such as, for example, left-eye blinks and/or right-eye blinks that are performed while the specific computer-generated images are being focused on. In this way, NED devices are enabled to identify combinations of user gaze direction and predetermined facial gestures and to translate these identified combinations into user input instructions that correspond to specific computer-generated images.

20 Claims, 18 Drawing Sheets

(56) References Cited

U.S. PATENT DOCUMENTS

| | | |
|---|---|---|
| 9,299,183 B2 | 3/2016 | Vesely |
| 9,335,547 B2 | 5/2016 | Takano et al. |
| 9,507,426 B2 | 11/2016 | Raffle |
| 9,514,538 B2 | 12/2016 | Ebisawa |
| 9,766,463 B2 | 9/2017 | Border et al. |
| 9,952,665 B2 | 4/2018 | Di Censo et al. |
| 10,067,561 B2 | 9/2018 | San Agustin Lopez |
| 2006/0250322 A1 | 11/2006 | Hall et al. |
| 2013/0050432 A1 | 2/2013 | Perez et al. |
| 2013/0050833 A1 | 2/2013 | Lewis et al. |
| 2013/0083003 A1 | 4/2013 | Perez et al. |
| 2013/0241805 A1 | 9/2013 | Gomez |
| 2014/0285404 A1* | 9/2014 | Takano .................. G06F 3/005 345/8 |
| 2015/0097772 A1 | 4/2015 | Starner |
| 2015/0262424 A1 | 9/2015 | Tabaka et al. |
| 2015/0301599 A1 | 10/2015 | Miller |
| 2015/0309568 A1* | 10/2015 | Miki ....................... G06F 3/013 345/173 |
| 2016/0025971 A1* | 1/2016 | Crow ................. G02B 27/0093 345/156 |
| 2016/0203359 A1* | 7/2016 | von und zu Liechtenstein ........... G06K 9/00335 345/156 |
| 2016/0225153 A1 | 8/2016 | Kim |
| 2017/0069135 A1 | 3/2017 | Komaki et al. |
| 2017/0108697 A1 | 4/2017 | El-ghoroury et al. |
| 2017/0123492 A1 | 5/2017 | Marggraff et al. |
| 2018/0300952 A1 | 10/2018 | Evans et al. |
| 2018/0350145 A1 | 12/2018 | Byl et al. |
| 2020/0128231 A1 | 4/2020 | Pace et al. |

FOREIGN PATENT DOCUMENTS

| | | |
|---|---|---|
| WO | 2014205422 A2 | 12/2014 |
| WO | 2015013022 A1 | 1/2015 |

OTHER PUBLICATIONS

"International Search Report and Written Opinion Issued in PCT Application No. PCT/US2019/055280", dated Feb. 27, 2020, 10 Pages.

"International Search Report and Written Opinion Issued in PCT Application No. PCT/US19/054911", dated Jan. 31, 2020, 10 Pages.

"International Search Report and Written Opinion Issued in PCT Application No. PCT/US19/054912", dated Feb. 6, 2020, 11 Pages.

"International Search Report and Written Opinion Issued in PCT Application No. PCT/US19/055279", dated Jan. 28, 2020, 12 Pages.

"International Search Report and Written Opinion Issued in PCT Application No. PCT/US19/055749", dated Feb. 4, 2020, 12 Pages.

"Non Final Office Action Issued in U.S. Appl. No. 16/383,498", dated Apr. 15, 2020, 20 Pages.

\* cited by examiner

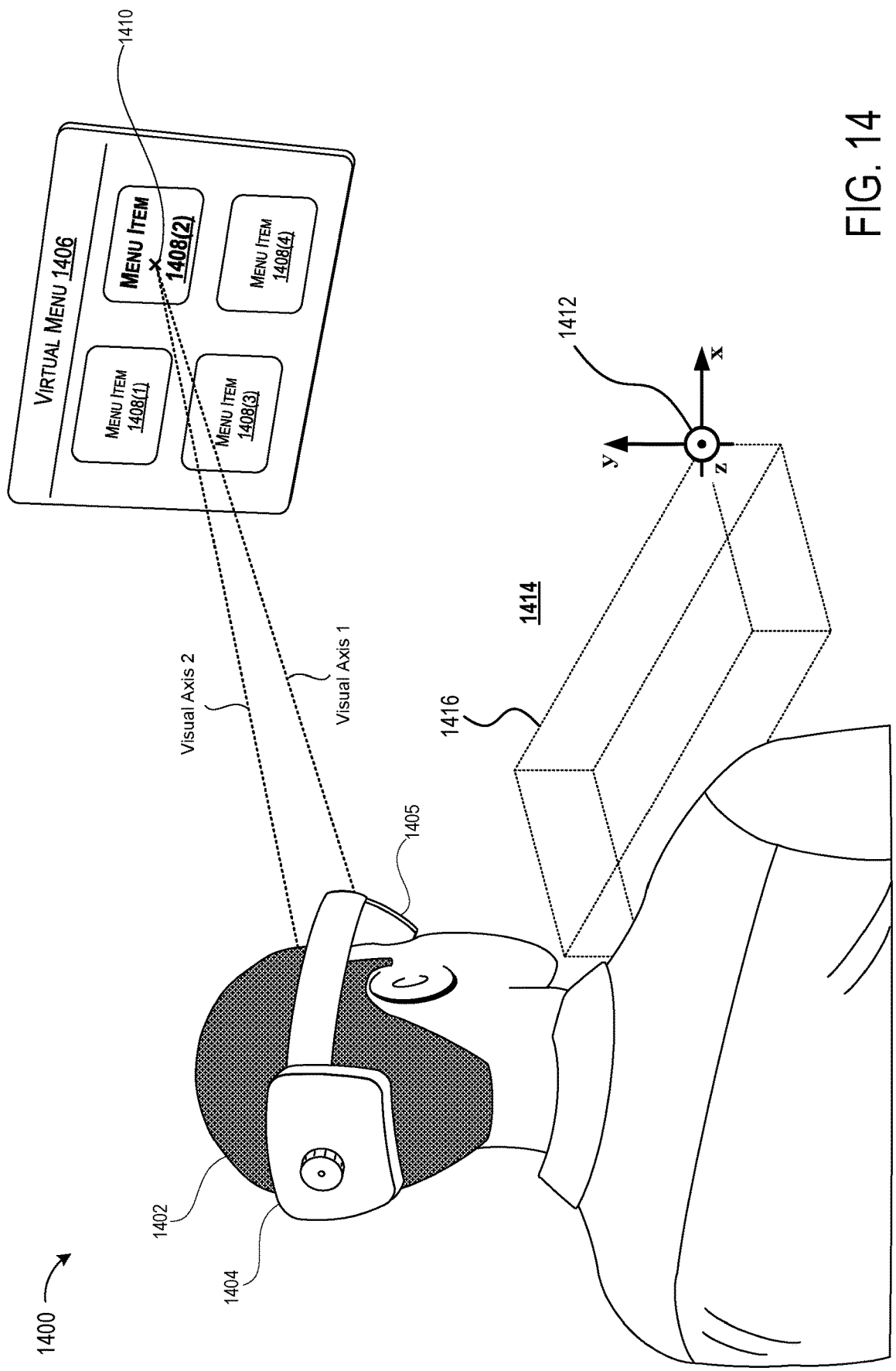

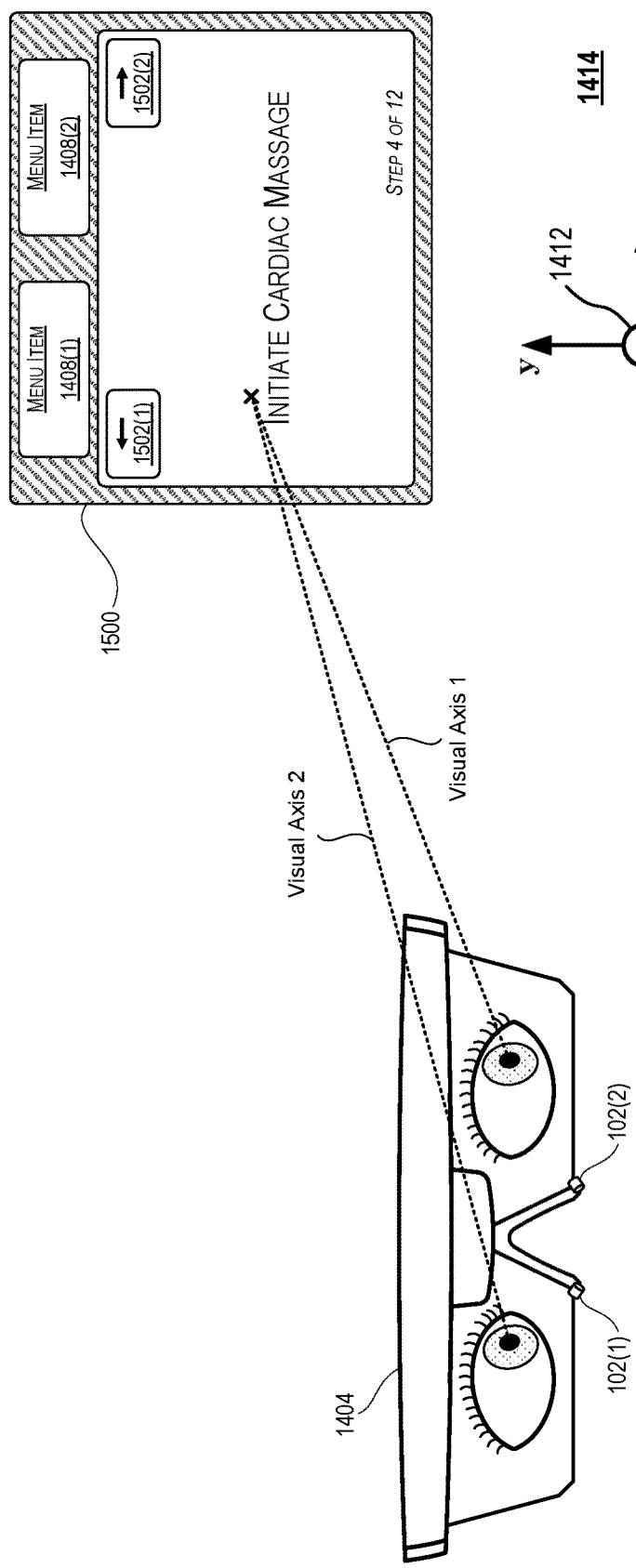
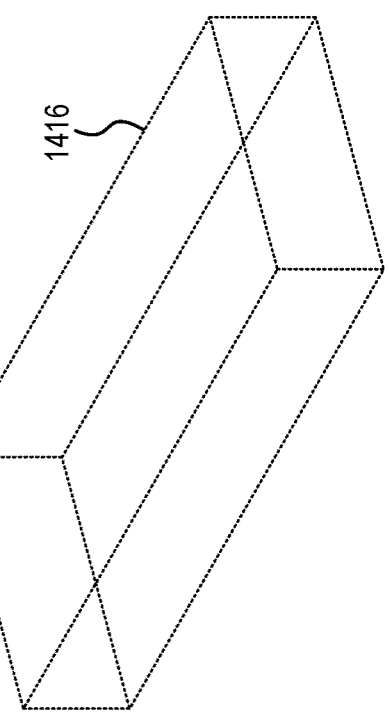
FIG. 15B

TRANSLATING COMBINATIONS OF USER GAZE DIRECTION AND PREDETERMINED FACIAL GESTURES INTO USER INPUT INSTRUCTIONS FOR NEAR-EYE-DISPLAY (NED) DEVICES

PRIORITY APPLICATION

This U.S. non-provisional application is a continuation in part application that claims benefit of and priority to U.S. Non-Provisional application Ser. No. 16/168,319, filed Oct. 23, 2018, entitled EYE TRACKING SYSTEMS AND METHODS FOR NEAR-EYE-DISPLAY (NED) DEVICES, the entire contents of which are incorporated herein by reference.

BACKGROUND

Near-Eye-Display (NED) systems are promising tools for increasing the productivity and efficiency with which people are able to perform a variety of complex tasks. This is largely due to the ability of NED systems to superimpose computer-generated images ("CG images") over a person's view of a real-world environment while the professional is performing a complex task. In this way, the professional is provided with information that is temporally pertinent to the task being performed (e.g., step-by-step instructions, real-time sensor readings, etc.) precisely when it is needed. As a specific example, a healthcare professional may wear a NED system while performing some task during which it is important to monitor a patient's vitals. In this example, the NED system may superimpose a readout of the patient's vitals over some portion of the healthcare professional's field-of-view.

Some conventional NED systems are designed to track users' hand movements in order to identify predetermined hand gestures that are assigned as being different user input instructions. For example, while wearing a conventional NED system, a user may make an "Air Tap" gesture to adjust the information that is currently being rendered. Unfortunately, performing some tasks require uninterrupted use of a person's hands which inherently limits the person's ability to perform hand gestures. Thus, conventional NED systems are ill-suited for maximally increasing the productivity and efficiency with which people are able to perform these hand intensive tasks.

It is with respect to these and other considerations that the disclosure made herein is presented.

SUMMARY

Technologies described herein provide for Near-Eye-Display (NED) devices that utilize eye tracking systems to translate combinations of user gaze direction and predetermined facial gestures into user input instructions. Generally described, an exemplary NED device includes an eye tracking system and a display component that renders computer-generated images within the user's field-of-view. The eye tracking system may continually track the user's eye movements with a high degree of accuracy to identify specific computer-generated images that a user is focused on. The eye tracking system may also identify various facial gestures that are performed while the specific computer-generated images are being focused on. In this way, NED devices are enabled to identify combinations of user gaze direction and predetermined facial gestures and to translate these identified combinations into user input instructions that are provided by the user in association with specific computer-generated images. Exemplary user input instructions include, but are not limited to, various computing instructions that are commonly associated with a standard left mouse button and right mouse button. As a specific example, a user wearing a NED device as described herein may use their gaze direction to controllably place a curser over a graphical control element within a virtual menu and then perform a double left blink facial gesture to activate the graphical control element.

Technologies described herein provide a marked improvement over conventional NED devices in that users are enabled to provide a wide array of "hands-free" user input instructions to, for example, adjust what type of information is currently being rendered, adjust the format with which information is currently being rendered, and so on. Real-life practical applications of these technologies include scenarios where users are performing hand intensive tasks that render conventional hand gestures impractical but that may benefit in terms of productivity and/or efficiency by providing the users with an ability to provide "hands-free" user input instructions.

For illustrative purposes, consider a scenario where a person is performing a complex task such as a surgical procedure that requires uninterrupted use of the person's hands. Further suppose that it is important for the person performing the surgical procedure to retain an ability to toggle between viewing various types of information that are pertinent to the task being performed. Such a scenario is well-suited for the user to wear a NED device that displays the pertinent information to the user while the task is being performed. It can be appreciated, however, that it is impractical in such a scenario for the person to perform hand gestures to interact with graphical control elements to toggle between viewing the various types of pertinent information. Using the techniques described herein, the person may simply and intuitively focus her attention onto a specific graphical control element that is being rendered by the NED device and then perform a predefined facial gesture to enter user input instructions with respect to the specific graphical control element that is being focused on. For example, the NED device may be rendering a sequence of step-by-step instructions for the person to follow in performance of the surgical procedure. Upon completion of an individual instruction that is currently being rendered, the person may focus her attention onto a "next step" button being rendered within her field-of-view and then deliberately blink her left eye to select the "next step" button to change the instruction being rendered. Upon identifying this combination of user gaze (e.g., the user is focused on the "next step" button) and the deliberate facial gesture (e.g., the user blinks her left eye twice within a threshold amount of time), the NED device may respond by toggling to the next instruction.

In an exemplary embodiment, a Near-Eye-Display (NED) device includes an eye tracking system having one or more sensors that generate eye tracking data that indicates a gaze direction (e.g., as defined by a visual axis or an optical axis) of one or both of a user's eyes. Based on the eye tracking data, the NED device may determine one or more computer-generated images that the NED device is generating via a display component and that the user is focused on. For example, the NED device may be rendering a graphical control element and may monitor the eye tracking data to determine when the user is focused on the graphical control element. It will be appreciated that the gaze direction of the user can in a way be analogized to a mouse curser element of a typical operating system. For example, the user focusing on a specific graphical control element may be treated similar to the user hovering a mouse curser over the graphical control element. The NED device may also be configured to monitor for one or more predetermined facial gestures such as, for example, a user blinking a left eye while a right eye remains open, the user blinking the right eye while the left eye remains open, the user blinking both eyes concurrently, or any other suitable facial gesture that a typical user may deliberately perform for purposes of providing a user input instruction to the NED device. In this way, the NED device identifies combinations of user gaze direction and predetermined facial gestures and, ultimately, translates these identified combinations into user input instructions.

In the exemplary embodiment, the NED device may utilize the display to render one or more computer-generated images within at least a portion of the user's field-of-view (FOV). For example, the NED device may render an individual instruction page of an ordered sequence of instruction pages within the user's FOV. The individual instruction page may include some form of data that is somehow useful to the user in performing a task. The individual instruction page may also include one or more individual computer-generated images that are designed for use as user interface elements (e.g., graphical control elements) associated with enabling the user to provide user input instructions. Exemplary user interface elements include, but are not limited to, input controls (e.g., checkboxes, radio buttons, dropdown lists, toggles buttons, etc.), navigational components (e.g., search fields, slider bars or track bars, etc.), and any other type of user interface element. A benefit of the techniques described herein is that a user whom is wearing the NED device is enabled to provide "hands-free" user input instructions that select a user interface element simply by gazing at the user interface element and then deliberately performing some predefined facial gesture.

With respect to a non-limiting but exemplary technique for monitoring gaze direction (e.g., to determine which particular user interface elements a user is focusing on), the eye tracking data may be associated with one or more substantially circular features of one or both of a user's eyes. Exemplary such "substantially" circular features include pupils and irises which are generally very close to circular and, therefore, may be modeled as perfect circles for purposes of the calculations described herein. The individual sensors have corresponding sensor planes that are angularly skewed with respect to the planes on which the circular features reside (e.g., an Iris-Pupil Plane). Based on the eye tracking data, the eye tracking system determines ellipse parameters for ellipses that result from these sensor planes being angularly skewed from the Iris-Pupil Planes. In some embodiments, the eye tracking system may track only one of the user's eyes. In other embodiments, the eye tracking system may track both of the user's eyes. In embodiments that track both eyes, the eye tracking system may determine ellipse parameters that define: (i) first ellipses that correspond to projections of an iris and/or pupil of a right eye onto a first sensor plane; and (ii) second ellipses that correspond to projections of an iris and/or pupil of a left eye onto a second sensor plane. The projections of each of the iris(es) and/or pupil(s) onto the corresponding sensor plane(s) may in some embodiments pass through a predetermined point such as, for example, an entrance pupil of each corresponding sensor.

Based on the ellipse parameters, the eye tracking system may then generate propagation data that defines three-dimensional (3D) propagations of the ellipses. The 3D propagation data may define a series of lines (e.g., rays) that extend from individual ellipses that are detected on the sensor plane. For example, individual lines of the series of lines may begin on the sensor plane at individual points along a perimeter of a detected ellipse. The individual lines may all commonly propagate from the sensor plane through a predetermined point toward the user's eyes. In some implementations, the predetermined point through which all lines of a particular 3D propagation pass is an entrance pupil of a corresponding sensor. Since all of the lines of these 3D propagations extend from the ellipse through the predetermined point, the 3D propagations may be graphically represented as an elliptic cone that extends from the predetermined point toward the eye.

The eye tracking system may utilize the propagation data to determine pupil orientation parameters that define various characteristics of the user's eye(s). Exemplary pupil orientation parameters may define optical axes for one or both of the user's eyes (e.g., an axis of an eye lens), visual axes for one or both of the user's eyes (e.g. axes that extend from the fovea through the lens and into the real-world environment), rotational angles of the user's eyes (e.g. an angle of rotation between a semi-axis of an ellipse and a horizontal axes of the sensor), Iris-Pupil Planes of the user's eyes (e.g. a plane on which the pupil resides), center points for the user's eyes (e.g., a point at which the optical axis (or alternatively the visual axis) intersects the Iris-Pupil plane). Additionally, or alternatively, the pupil orientation parameters may define various other characteristics of the user's eyes.

As described in detail below, the eye tracking system may utilize the pupil orientation parameters to continually determine of a current (e.g., real time) IPD for a user, i.e. while the NED device is operating. For example, the eye tracking system may dynamically track the center points for each of the user's two eyes and continually calculate and re-calculate the user's interpupillary distance in near real time. Additionally, or alternatively, the eye tracking system may utilize the pupil orientation parameters to determine a vergence of two visual axes (which are different than the optical axis) of the user. For example, the eye tracking system may dynamically track the visual axis of each of the user's two eyes and continually calculate a location in space at which the distance between these two visual axes is the smallest. In various implementations, the visual axes are determined based on visual axis offset data that indicates at least an angular relationship between the optical axis and the visual axis. As described in detail below, this visual axis offset data may be specifically custom to a particular user and may be determined through a user-specific calibration process. It can be appreciated that although vergence is generally understood as the "point" at which the user's two visual axis intersect, in a practical sense these axes rarely mathematically intersect but rather simply become the closest at the user's accommodation plane. Thus, as described herein the vergence of the visual axes may be determined by calculating a point in space at which the separation between the two visual axes is the least (i.e., wherever the two axes become closest together).

In some embodiments, the pupil orientation parameters may be determined by analyzing the propagation data with respect to an ocular rotation model to calculate an orientation of the Iris-pupil plane for an eye, a distance from a predetermined point of the sensor to a center of an entrance pupil of the eye, and/or a radius of the pupil of the eye. The ocular rotation model may be usable to model rotation of a circular feature of an eye around that eye's center of rotation. For example, the ocular rotation model may be (or be based on) an equation that defines coordinates for a circle of a particular radius as that circle is rotated around the center of an eye. It can be appreciated that a circle of a specific radius will mathematically match the "elliptical" 3D propagations only at a single plane. Therefore, utilizing various error minimization algorithms to analyze the propagation data with respect to the ocular rotation model may yield the Iris-Pupil plane's specific location in space and the circular pupil's specific location and rotation thereon. Although some specific error minimization algorithms are described herein, such descriptions are provided for exemplary purposes only and other error minimization algorithms may also be used.

Although exemplary and non-limiting, the foregoing techniques provide for highly accurate monitoring of gaze direction and are suitable for determining which particular user interface elements a user is focusing on. Moreover, since the substantially circular feature that is being tracked in the foregoing techniques will become obstructed by the user's eyelid while a blink is being performed, the foregoing techniques are also suitable for monitoring for certain types of predetermined facial gestures. Thus, such techniques may be used by the exemplary NED device to identify combinations of user gaze direction and predetermined facial gestures which are then translated into user input instructions for "hands-free" control of various aspects of the NED device and/or the content being displayed thereby.

It should be appreciated that any reference to "first," "second," etc. items and/or abstract concepts within the Summary and/or Detailed Description is not intended to and should not be construed to necessarily correspond to any reference of "first," "second," etc. elements of the claims. In particular, within the Summary and/or Detailed Description, items and/or abstract concepts such as, for example, three-dimensional (3D) propagations and/or circular features of eyes and/or sensor entrance pupils may be distinguished by numerical designations without such designations corresponding to the claims or even other paragraphs of the Summary and/or Detailed Description. For example, any designation of a "first 3D propagation" and "second 3D propagation" of the eye tracking system within any specific paragraph of this the Summary and/or Detailed Description is used solely to distinguish two different 3D propagations of the eye tracking system within that specific paragraph—not any other paragraph and particularly not the claims.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

FIG. 14 illustrates an exemplary computing environment in which a user is providing user input instructions to a NED device in the form of combinations of user gaze direction and predetermined facial gestures.

FIG. 15B is similar to FIG. 15A with the exception that the user's gaze direction has changed from being on a work space below a virtual scene to being focused on the virtual scene.

DETAILED DESCRIPTION

The following Detailed Description describes technologies for utilizing eye tracking systems to identify user input instructions provided in the form of combinations of user gaze direction and predetermined facial gestures. The technologies described herein enable a user to provide "hands-free" user input instructions to a Near-Eye-Display (NED) device that includes a display to render computer-generated images within the user's field-of-view (FOV) and an eye tracking system to monitor where within the FOV the user is currently focused. Specifically, the eye tracking system may continually track the user's eye movements with a high degree of accuracy to identify specific user interface elements (e.g., graphical control elements) that a user is focused on. The eye tracking system may also identify various facial gestures that are performed deliberately (e.g., voluntarily as opposed to spontaneously or reflexively) while the specific user interface elements are being focused on. In this way, various computing systems such as NED devices are enabled to identify combinations of user gaze direction and predetermined facial gestures and, ultimately, to translate these identified combinations into user input instructions that are provided in association with specific user interface elements.

Technologies described herein provide a marked improvement over conventional NED devices in that users are enabled to provide a wide array of "hands-free" user input instructions to, for example, adjust what type of information is currently being rendered, adjust the format with which information is currently being rendered, and so on. Real-life practical applications of these technologies include providing a user with an ability to provide "hands-free" user input instructions in scenarios where the user is a performing hand intensive task that renders conventional hand gestures impractical. The disclosed techniques therefore represent a substantial advance toward providing users with access to and control over deeply immersive augmented-reality (AR) content in a variety of practical scenarios.

Aspects of the techniques described herein are primarily described in the context of a specific scenario where a person is performing a complex task such as a surgical procedure that requires uninterrupted use of the person's hands. While the disclosed techniques are not necessarily limited to such a scenario where a user's hand are temporarily unavailable to provide gesture input, an appreciation of various aspects of the invention is best gained through a discussion of an example in such a context. However, the techniques described herein applicable to a variety of other contexts such as simply providing a user that is in a public setting (e.g., a restaurant) with an ability to discretely control a NED device. Various techniques described herein are extendable to facilitate "hand-free" user input instructions in any other suitable context.

Figure 1:
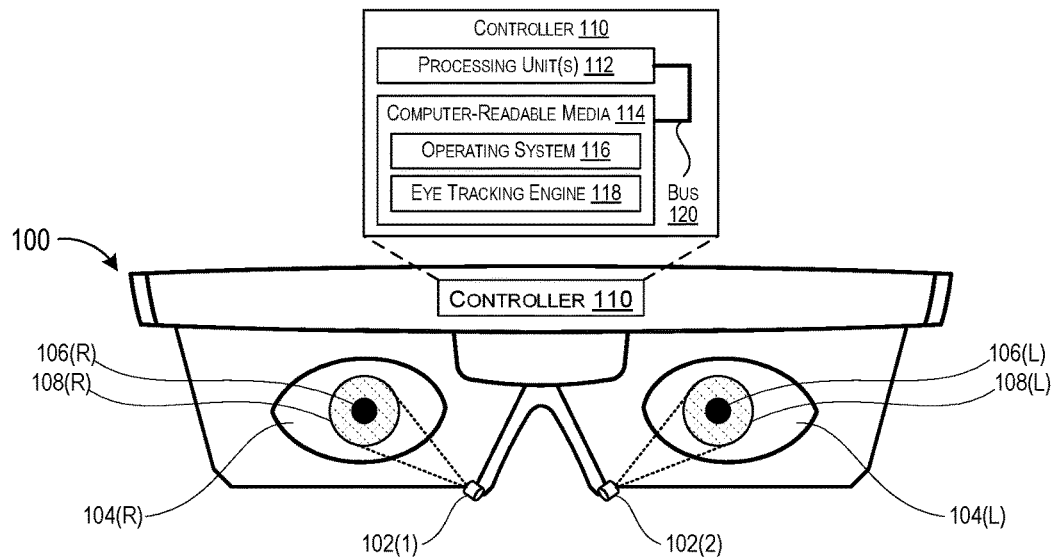
FIG. 1 illustrates an exemplary hardware layout for a Near-Eye-Display (NED) device that is configured to implement the methods described herein.

Turning now to FIG. 1, illustrated is an exemplary hardware layout for a Near-Eye-Display (NED) device 100 that is configured to implement the methods described herein. In the exemplary hardware layout the NED device 100 includes a pair of sensors 102 that are each directed toward a corresponding eye 104 of a user. More specifically, the illustrated NED device 100 includes a first sensor 102(1) that is angularly offset from and directed toward a right eye 104(R) and also a second sensor 102(1) that is angularly offset from and directed toward a left eye 104(L). The right eye 104(R) includes a corresponding pupil 106(R) and a corresponding iris 108(R). The left eye 104(L) includes a corresponding pupil 106(L) and a corresponding iris 108(L). The sensors 102 can be in any suitable form such as, for example, a non-contact sensor configured to use optical-based tracking (e.g. video camera based and/or some other specially designed optical-sensor-based eye tracking technique) to monitor the one or more physical characteristics of the user's eyes. Exemplary physical characteristics include, but are not limited to, pupil size, a rate of change of pupil size, gaze direction, and/or a rate of change to a gaze direction.

FIG. 1 is illustrated from a perspective that is directly in front of the optical axes of the eyes 104 so that the pupils 106 and irises 108 appear perfectly circular. It will be appreciated by one skilled in the art that in humans (and many other vertebrates for that matter) the pupils 106 and irises 108 of the eyes 104 are almost perfect circles. Therefore, in various calculations described below, the pupils 106 and/or irises 108 are mathematically modeled as and/or presumed to be perfectly circular in shape. From the perspective of the individual sensors 102, however, the pupils 106 and irises 108 of the eyes 104 appear to be elliptical as described herein. This is because the sensors 102 are angularly offset from the eyes 104 in the sense that the optical axis of each individual sensor 102 is not parallel to the optical axis of the eye 104 it is tracking. The position of the sensors 102 shown in FIG. 1 is for illustrative purposes only. It will be appreciated that the techniques described herein can be performed with the sensors 102 being located in a variety of positions with respect to the eyes. As a specific but nonlimiting example, the sensors could be embedded within a lens or other substrate directly in front of the eyes.

In the illustrated embodiment, the NED device 100 further includes a controller 110 that is configured to implement the various operations of the methods described herein. The controller 110 may be communicatively coupled to the sensors 102 to receive eye tracking data that is generated by the sensors 102 in association with the circular features of the eyes. The controller 110 may further be communicatively coupled to other componentry of the NED display device 100. The controller 110 includes one or more logic devices and one or more computer memory devices storing instructions executable by the logic device(s) to deploy functionalities described herein with relation to the NED device 100. The controller 116 can comprise one or more processing units 112, one or more computer-readable media 114 for storing an operating system 116 and data such as, for example, eye tracking data, visual axis offset data, application data, etc. The computer-readable media 114 may further include an eye tracking engine 116 configured to receive the eye tracking data from the sensor 102 and, based thereon, determine one or more physical characteristics of the user's eyes using the methods and techniques described herein. The components of the NED device 100 are operatively connected, for example, via a bus 120, which can include one or more of a system bus, a data bus, an address bus, a PCI bus, a Mini-PCI bus, and any variety of local, peripheral, and/or independent buses.

The processing unit(s) 112, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 114, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The NED device 100 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

Figure 2:
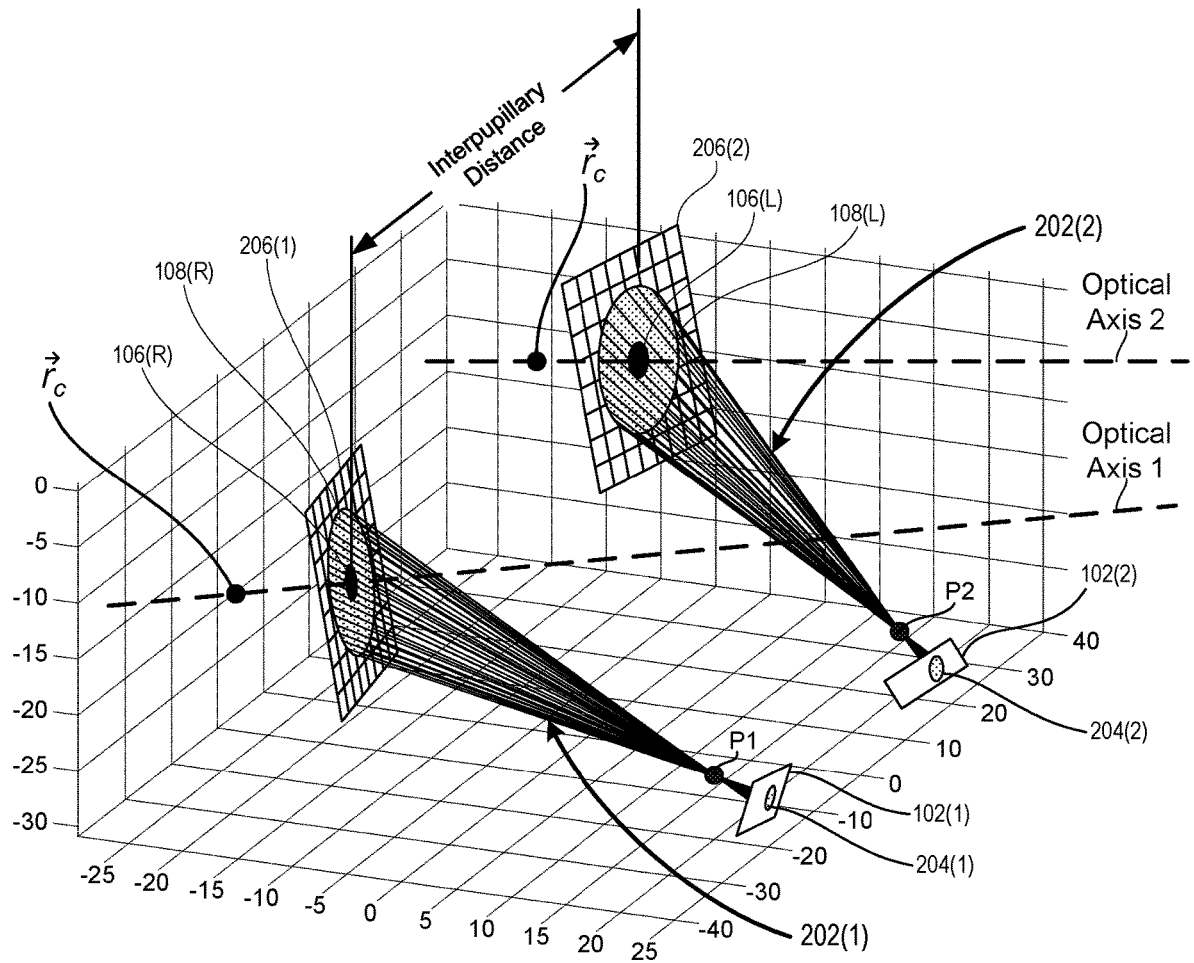
FIG. 2 illustrates a pair of three-dimensional (3D) propagations that extend from ellipses that result from circular features of user's eyes being projected into the sensors.

Turning now to FIG. 2, illustrated is a pair of three-dimensional (3D) propagations 202 that extend from ellipses 204 that result from circular features (e.g., pupils 106 and/or irises 108) of user's eyes 104 being projected into the sensors 102. As illustrated, a first 3D propagation 202(1) extends from a first ellipse 204(1), which is detected at the first sensor 102(1), through a first point P1. As further illustrated, a second 3D propagation 202(2) extends from a second ellipse 204(2), which is detected at the second sensor 102(2), through a second point P2. Each of the 3D propagations 202 extend toward a corresponding Iris-Pupil plane 206 that is angularly offset with respect to the sensors 102. The angularly offset nature of the Iris-Pupil planes 206 results in the pupils 106 and irises 108 appearing elliptical from the perspectives of the sensors 102.

As illustrated, each of the individual 3D propagations 202 may include a series of lines that extend from a perimeter of a corresponding individual ellipse 204 through a corresponding predetermined point and, ultimately, to the perimeter of a circular feature (e.g., pupil 106 or iris 108) that resides within a corresponding Iris-Pupil plane 206. The predetermined points (e.g., P1 and P2) may correspond to specific points in space that are measurable in relation to corresponding sensors 102. For example, the first predetermined point P1 may correspond to a center of an entrance pupil of the first sensor 102(1) whereas the second predetermined point P2 may correspond to a center of an entrance pupil of the second sensor 102(2). Thus, it can be appreciated that P1 may correspond to a point in space at which light rays cross prior to forming an image within the first sensor 102(1) and that P2 may correspond to a point in space at which light rays cross prior to forming an image within the second sensor 102(2).

As described in more detail below, these 3D propagations 202 may be used to determine pupil orientation parameters that define various characteristics of the user's pupil(s) 106. For example, it can be appreciated that the 3D propagations 202 can be mathematically modeled as elliptical cones. This is because individual ones of the 3D propagations 202 originate at a corresponding ellipse 204 and pass through a singular point. It can further be appreciated that a cross-section of an elliptical cone will be circular in shape if that cross-section is taken at a specific orientation. Thus, by using the mathematical assumption that the pupils 106 and irises 108 are circular in shape, the 3D propagations 202 may enable a determination of the specific orientation of the Iris-Pupil planes 206. Additionally, as described in more detail below, performing various error minimization techniques of the 3D propagations with respect to an ocular rotation model may further enable a determination of the center points of the pupils 106. It can be appreciated that once the location in space of the center point of a pupil 106 and an orientation of an Iris-Pupil plane 206 is known for a particular eye, the optical axis (illustrated as dashed lines for each eye) for that particular eye is also known.

Figure 3:
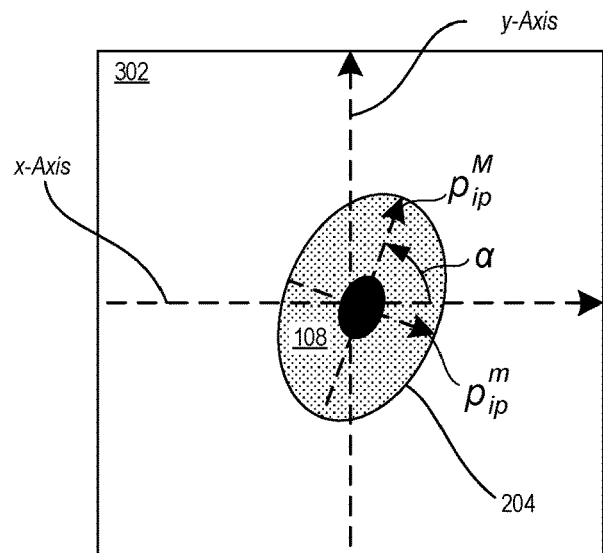
FIG. 3 illustrates in an exemplary ellipse that is being projected onto a sensor plane within a sensor that is angularly skewed with respect to the Iris-Pupil plane (not shown in FIG. 3) so that circular features on the Iris-Pupil plane appear elliptical on the sensor plane.

Turning now to FIG. 3, illustrated in an exemplary ellipse 204 that is projected from a circular feature of an eye 104 (e.g., an Iris 108) onto a sensor plane 302 of a sensor 102. The sensor plane 302 may correspond to a substantially planar surface within the sensor 102 that is angularly skewed with respect to a corresponding Iris-Pupil plane 206 (not shown in FIG. 3) so that circular features on the Iris-Pupil plane appear elliptical on the sensor plane 302. In some embodiments, the sensors 102 may be image sensors such as, for example, complementary metal oxide semiconductor (CMOS) sensors and/or charge-coupled device (CCD) sensors. In such embodiments, the sensors 102 may generate eye tracking data in the form of pixel data that defines images of the eyes. These images may be formed based on ambient light surrounding the user. Thus, in contrast to conventional eye tracking systems that rely on illuminating the eye(s) with near infrared light to cause first Purkinje reflections (e.g., "glints") that are distributed around the iris, the techniques disclosed herein do not require active emission of near infrared light toward the user's eyes. The numerous benefits of the techniques disclosed herein include providing a system that can track the user's eyes using ambient light rather than having to expend battery resources to generate near infrared light. Moreover, the disclosed techniques provide a system that is highly sensitive and accurate in the detection of eye movements (e.g., the systems are sensitive enough to even accurately track saccadic eye movements).

Semi-axes for the "elliptically shaped" iris 108 and/or pupil 106 are uniquely oriented within the sensor plane 302 for any particular subtended angle of the sensor 102 and rotation of the eye being tracked. The size of the semi axes of the elliptically shaped iris 108 and pupil 106 depend on the original size of each and any magnification caused by optical components (e.g., lenses, etc.) of the sensor 102. In FIG. 3, the semi-major axis of the elliptically shaped iris 108 is labelled $p_{ip}^M$ and the semi-minor axis of the elliptically shaped iris 108 is labelled $p_{ip}^m$. The sensor plane 302 is illustrated with a sensor coordinate system centered thereon. The sensor coordinate system includes a vertical y-Axis and a horizontal x-Axis. Additionally, as illustrated, the elliptically shaped iris 108 is rotated an angle α with respect to the horizontal x-Axis. Therefore, within the sensor plane 302, an ellipse 204 that is centered at $(x_{ip}^{-d}, y_{ip}^{-d})$ with semi-major axis $p_{ip}^M$ and semi-minor axis $p_{ip}^m$ and that is also rotated an angle α with respect to the horizontal x-Axis is given by Equation 1 shown below:

$$E_{ip}(i,j) = \{x_{ip}^{-d} + p_{ip}^M \cos[\varphi(i,j)]\cos(\alpha) - p_{ip}^m \sin[\varphi(i,j)]\sin(\alpha), y_{ip}^{-d} + p_{ip}^M \cos[\varphi(i,j)]\sin(\alpha) - p_{ip}^m \sin[\varphi(i,j)]\cos(\alpha)\} \quad (1)$$

Figure 4:
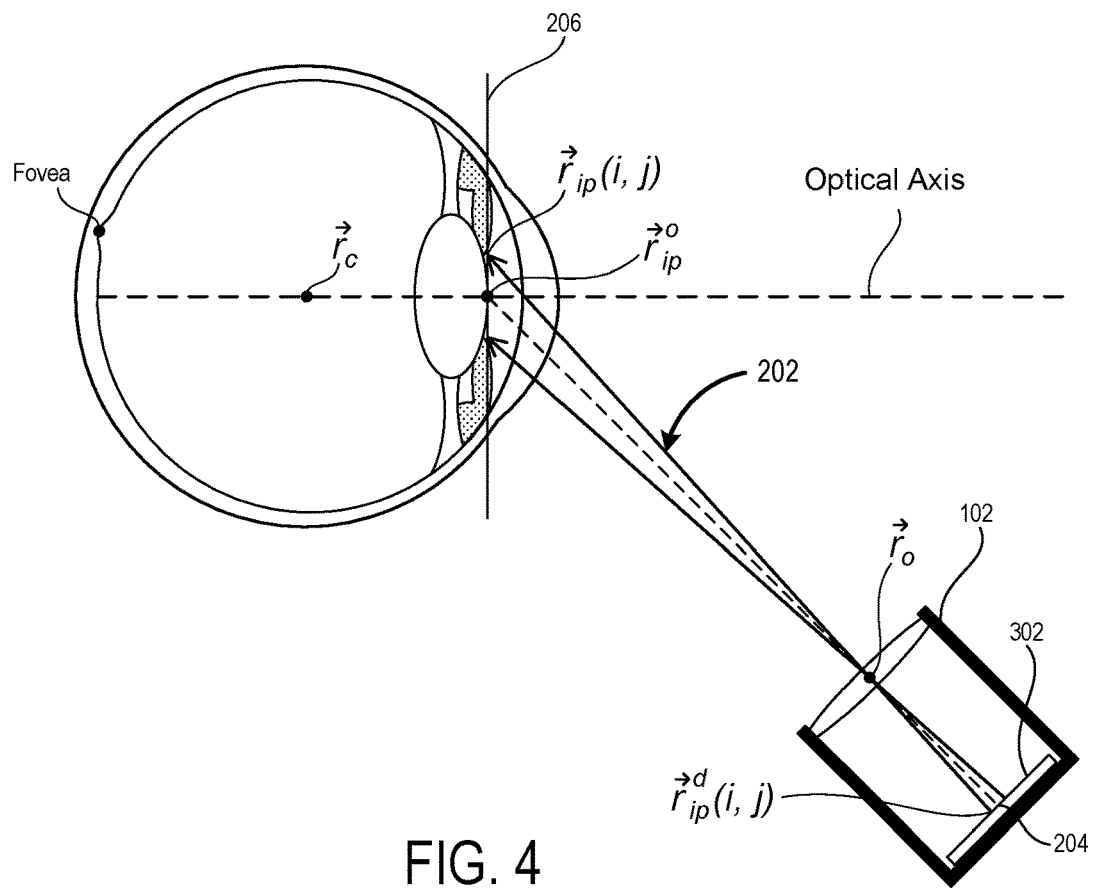
FIG. 4 illustrates a side view of a 3D propagation of the ellipse of FIG. 3 from the sensor plane through a predetermined point and toward the Iris-Pupil plane.

Turning now to FIG. 4, illustrated is a side view of a 3D propagation 202 of the ellipse 204 of FIG. 3 from the sensor plane 302 through a predetermined point. In the illustrated embodiment, the predetermined point is labeled $\vec{r}_o$ and is defined as the center of the entrance pupil for the sensor 102. To improve the clarity of the illustration, only two individual 3D rays of the 3D propagation 202 are shown. Each individual ray extends from a point on the sensor plane 302 that falls along the perimeter of the ellipse 204 through the point $\vec{r}_o$ and, ultimately, to a point on the Iris-Pupil plane 206 that falls along the perimeter of the pupil 106 or iris 108. In plain terms, the 3D propagation 202 represents the reverse of the projections of the pupil 106 or iris 108 through the point $\vec{r}_o$ and to the sensor plane 302. Thus, in three dimensional terms the rays that start from the sensor plane 302 and pass through point $\vec{r}_o$ (e.g., the center of the entrance pupil of the sensor 102) and then travel some additional distance to reach the circular perimeter of the pupil 106 or iris 108 at the Iris-Pupil plane 206 is given by Equation 2 shown below:

$$\vec{r}_{ip}^d(i,j) = \vec{r}_o[\sqrt{p_{ip}^2 + d_{ipo}^2} + \sqrt{|D_{cip}(i,j)|^2 + f^2}]\hat{T}_{oip}(i,j) \quad (2)$$

where, $\vec{r}_o$ is a point at which all of the rays of a particular image cross prior to forming an image on the sensor plane 302, $d_{ipo}$ is the distance from the point $\vec{r}_o$ to the center of the iris/pupil $\vec{r}_{ip}^O$ (as labeled in FIG. 4), $D_{cip}$ is the radial distance between the center of the sensor 102 and the ellipse points $E_{ip}$, f is the focal length of the sensor 102, and $\hat{T}_{oip}(i,j)$ is the vector going from the points in the ellipse 204 to the point $\vec{r}_o$.

In some embodiments, the systems described herein may determine one or more of an orientation Rot(φ, θ) of the Iris-Pupil plane 206, a radius $p_{ip}$ of the pupil 106 or iris 108 (e.g., whichever circular feature is being observed to perform eye tracking), and the distance $d_{ipo}$ from the point $\vec{r}_o$ to the center $\vec{r}_{ip}^O$ of the iris/pupil by analyzing the 3D propagations 202 with respect to an ocular rotation model. The ocular rotation model may be usable to model rotation of a circular feature of an eye around that eye's center of rotation $\vec{r}_c$. For example, an ocular rotation model may define coordinates of a circle with a center $\vec{r}_{ip}^O(i,j)$ and a radius $p_{ip}$ and that is rotated around the eye's center of rotation $\vec{r}_c$ an elevation angle θ and azimuth angle φ as given by Equation 3 shown below:

$$\vec{r}_{ip} = Rot(\phi,\theta) \cdot (\vec{r}_{ip}^O + \vec{r}_{ip}^c(i,j) - \vec{r}_c) + \vec{r}_c \quad (3)$$

where the position of the center of the circle is given by $\vec{r}_{ip}^O = \{\vec{x}_{ip}^O, \vec{y}_{ip}^O, \vec{z}_{ip}^O\}$, and the parametrized coordinates of the circle are defined as $\vec{r}_{ip}^c(i,j) = \{p_{ip} \cos \varphi, p_{ip} \sin \varphi, 0\}$. In various embodiments, the center of the iris/pupil circle and the center of rotation of the eye $\vec{r}_c$ are defined from one or more anatomical eye models such as, for example, the Gullstrand model, the Arizona model, the Liou-Brennan model, and/or the Navarro model. Moreover, as described in more detail below, a user-specific calibration may be performed to complete global minimization of the various parameters used in Equation 3 to customize the ocular rotation model to a specific user.

As a specific but non-limiting example, the orientation Rot(φ, θ) of the Iris-Pupil plane 206, the radius $p_{ip}$ of the pupil 106 or iris 108, and the distance $d_{ipo}$ from the point $\vec{r}_o$ to the center $\vec{r}_{ip}^O$ of the iris/pupil are determined by minimizing the error between the 3D propagations 202 of the points detected (e.g., in the sensor plane 302) $\vec{r}_{ip}^d$ through the vector $\hat{T}_{cip}(i,j)$, and a circle of radius $p_{ip}$ rotated around the eye center $\vec{r}_c$. An exemplary such error minimization technique is given by Equation 4 shown below:

$$Err(p_{ip}, d_{ipo}, Rot(\phi, \Theta)) = \text{argmin} \sum_{i,j} \left\| \vec{r}_{ip}^d(i,j) - \vec{r}_{ip}(i,j) \right\|^2 \quad (4)$$

It will be appreciated that upon determining the orientation Rot(φ, θ) of the Iris-Pupil plane 206 and the distance $d_{ipo}$ from the point $\vec{r}_o$ to the center $\vec{r}_{ip}^O$ of the iris/pupil, the systems disclosed herein can then determine where an optical axis for a tracked eye begins and in which direction it propagates with respect to the sensor 102. Additionally, in embodiments that include two sensors 102 which are separated by a known distance, upon determining the location of the center $\vec{r}_{ip}^O$ of the pupil for both eyes in relation to the sensors 102, the systems disclosed herein can dynamically determine an interpupillary distance (IPD) for the user (as shown in FIG. 2).

Figure 5A:
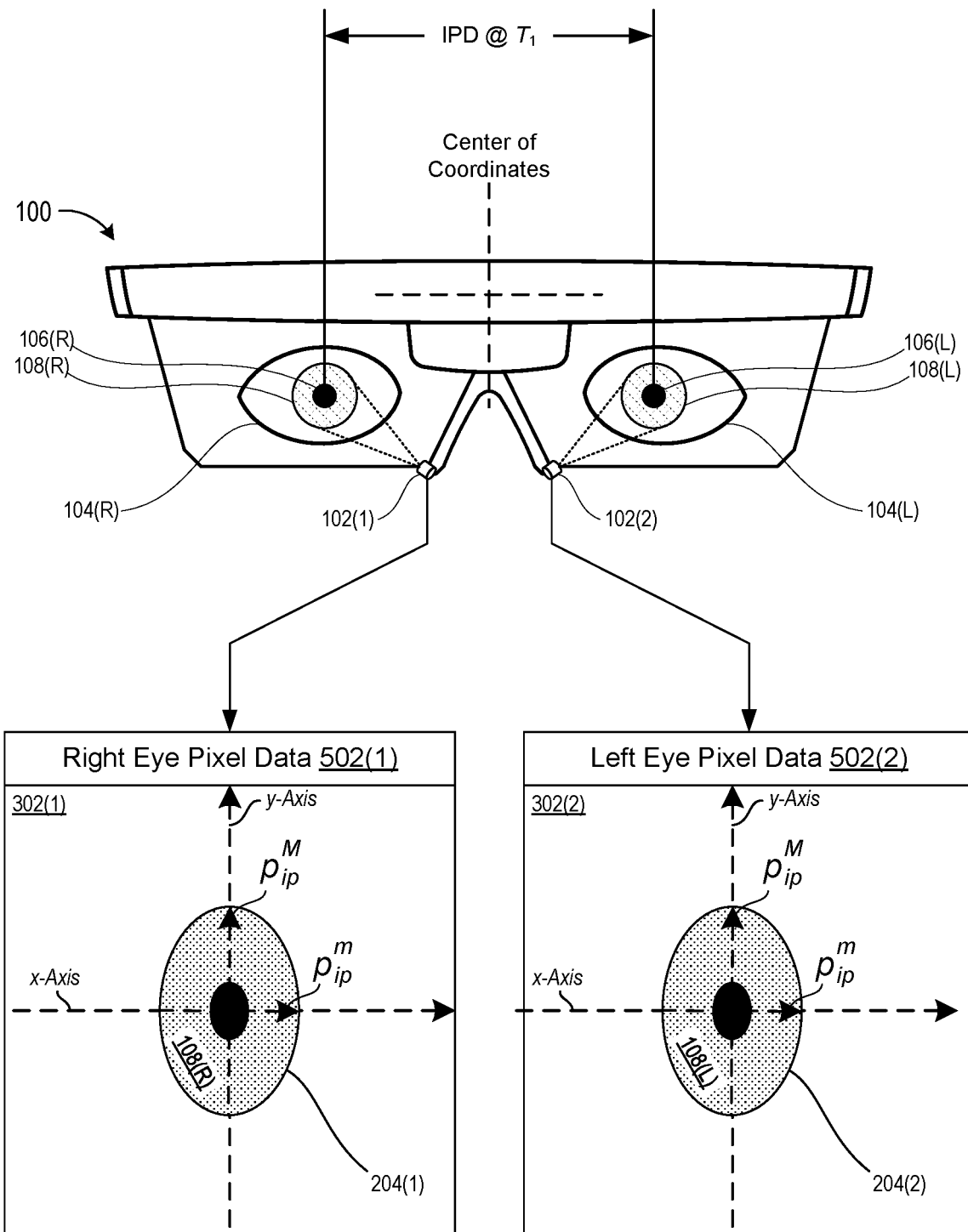
FIG. 5A illustrates exemplary eye tracking data in the form of pixel data that is generated by the sensors and that is usable to implement the techniques described herein.

Turning now to FIG. 5A, exemplary eye tracking data is shown in the form of pixel data 502 that is generated by the sensors 102 and that is usable to implement the techniques described herein. As illustrated in FIG. 5A, a NED device 100 includes a first sensor 102(1) that is angularly offset from and directed toward a user's right eye 104(R) and a second sensor 102(2) that is angularly offset from and directed toward a user's left eye 104(L). As the user's eyes move around to look at and/or track various objects within the user's field-of-view (FOV), the sensors 102 continually capture images of the pupils 106 and/or irises 108 of the user's eyes.

Similar to FIG. 1, FIG. 5A is illustrated from a particular perspective that is directly in front of the user's while the user's is looking straight forward. Thus, the optical axis of each of the eyes 104 is normal to the page and the pupils 106 and irises 108 are illustrated to be perfect circles. Since each of the sensors 102 is angularly offset from the optical axis of the particular eye that it is imaging, the pixel data 502 corresponding to each eye defines the pupils 106 and irises 108 as ellipses. As described above, these ellipses correspond to projections of the pupils 106 and irises 108 onto the corresponding sensor planes 302. Moreover, depending on the optical characteristics of the sensors 102 and/or lenses thereof, these projections may be defined by a series of rays that all pass through a common point such as the center of the entrance pupil of the sensor 102.

As described above, the ellipses that are formed by the projections of the pupils 106 and/or irises 108 onto the corresponding sensor plane 302 have unique orientations and semi-axes for any particular subtended angle of the sensor 102 and rotation of the eye being tracked. As illustrated in FIG. 5A, each of the right eye pixel data 502(1) and the left eye pixel data 502(2) define an image of a corresponding elliptically shaped iris 108. Each elliptically shaped iris 108 has a semi-major axis that is labelled $p_{ip}^{M}$ and a semi-minor axis that is labelled $p_{ip}^{m}$. The sensor planes 302 are each illustrated with a corresponding sensor coordinate system centered thereon. Each sensor coordinate system includes a vertical y-Axis and a horizontal x-Axis. Additionally, as illustrated, each elliptically shaped iris 108 is aligned with (e.g., centered on and not rotated with respect to) a corresponding sensor coordinate system. Thus, within each of the sensor planes 302(1) and 302(2), the perimeters of the right elliptically shaped iris 108(R) and the left elliptically shaped iris 108(L) define a first ellipse 204(1) and a second ellipse 204(2), respectively. Each of the ellipses 204 are centered at $(x_{ip}^{-d}, y_{ip}^{-d})$ with semi-major axis $p_{ip}^{M}$ and semi-minor axis $p_{ip}^{m}$ and is not rotated respect to the horizontal x-Axis of their corresponding sensor plane 302.

Figure 5B:
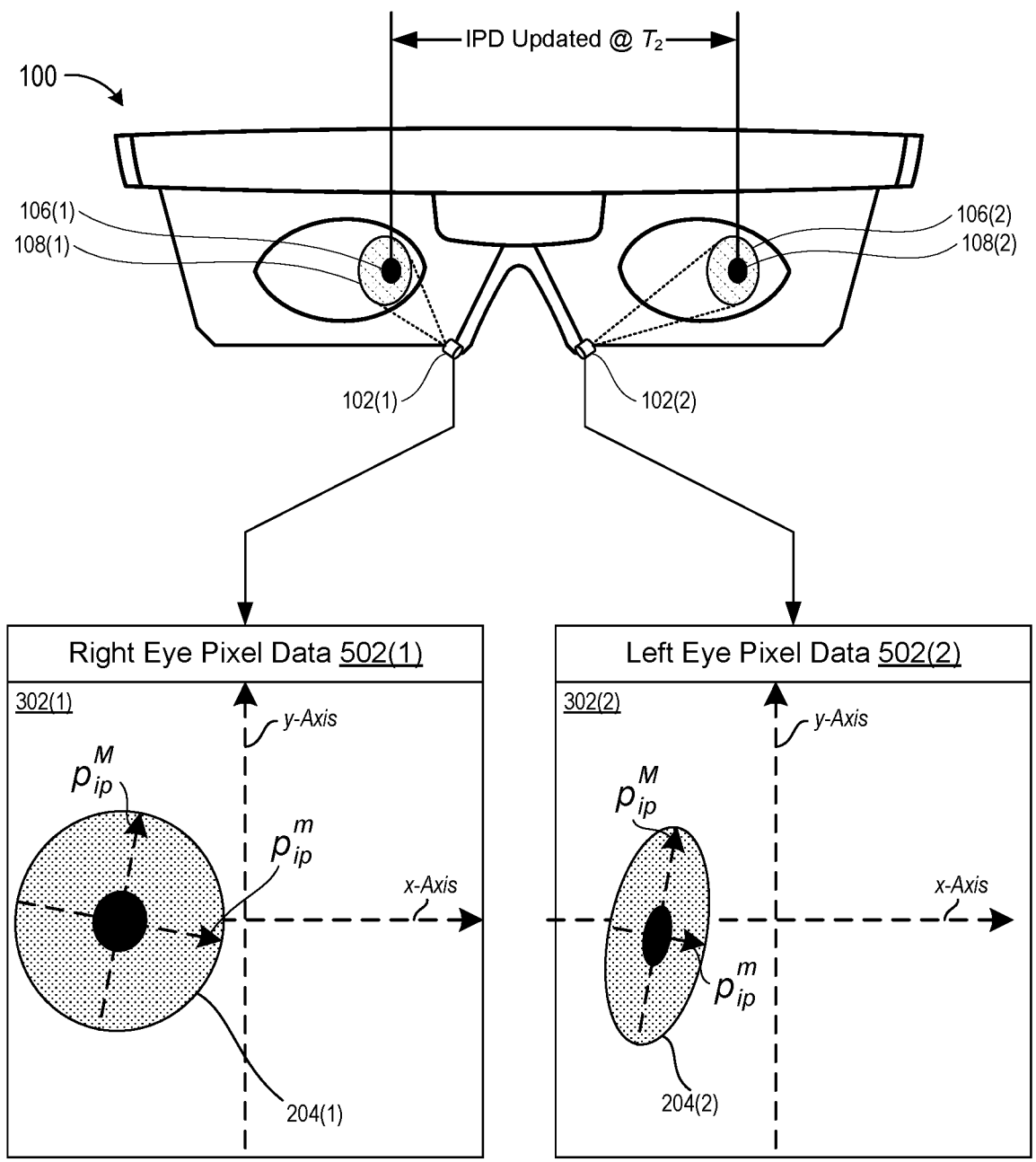
FIG. 5B illustrates exemplary eye tracking data in the form of pixel data that has changed in relation to FIG. 5A due to the user's focus shifting to the left.

Turning now to FIG. 5B, exemplary eye tracking data is shown in the form of pixel data 502 that has changed in relation to FIG. 5A due to the user's focus shifting to the left. As illustrated, the first ellipse 204(1) that corresponds to the projection of the user's right eye 104(R) has shifted and rotated in relation to the first sensor plane 302(1). Additionally, the semi-minor axis $p_{ip}^{m}$ of the first ellipse 204(1) has lengthened since the right eye's optical axis is directed more towards the sensor 102(1) in FIG. 5B (e.g., after the user looks left) that it was in FIG. 5A. As further illustrated, the second ellipse 204(2) that corresponds to the projection of the user's left eye 104(L) has shifted and rotated in relation to the second sensor plane 302(2). Additionally, the semi-minor axis $p_{ip}^{m}$ of the second ellipse 204(2) has shortened since the left eye's optical axis is directed more away from the second sensor 102(2) in FIG. 5B (e.g., after the user looks left) that it was in FIG. 5A.

In various embodiments, the eye tracking data for the user's two eyes may be used to continually and dynamically determine the current (e.g., real time) interpupillary distance (IPD) of the user. In particular, the eye tracking data may be analyzed to determine ellipse parameters that define the ellipses 204 for each eye within the corresponding sensor plane 302. Then, using the techniques described above with respect to equations 1 through 4, the center points $\vec{r}_{ip}^{\,O}$ for each eye may be determined with respect to the corresponding sensor 102. Since the sensors 102 are mechanically fixed at known locations and angles with respect to each other, the determined center points $\vec{r}_{ip}^{\,O}$ for the right eye 104(R) with respect to the first sensor 102(1) and the left eye 104(L) with respect to the second sensor 102(2) together yield the IPD at particular time at which the pixel data was captured. Thus, as shown in FIG. 5A, an IPD can be initially determined in association with pixel data that is captured at a first time $T_1$. Then, as shown in FIG. 5B after the user has looked to the left, an updated IPD can be determined can be determined in association with other pixel data that is captured at a second time $T_2$.

Figure 6:
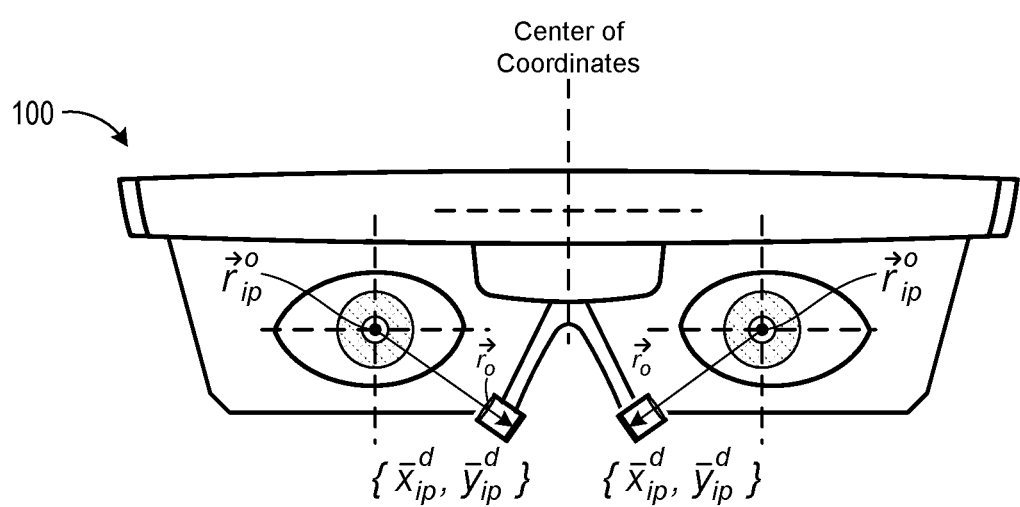
FIG. 6 illustrates exemplary positions of a user's fovea in relation to the optical axes of the user's left and right eyes.

Turning now to FIG. 6, illustrated is the exemplary NED device 100 with various geometrical features labeled thereon that are relevant to a specific technique for calculating the interpupillary distance (IPD). It can be appreciated that Equation 2 as described above can be modified to specifically place the center of the pupil $\vec{r}_{ip}^{\,d}$ (center) in space for both the left and right eyes. Specifically, Equation 2 can be modified into Equation 2.1 as shown below:

$$\vec{r}_{ip}^{\,d}(\text{center}) = \vec{r}_o + [d_{ipo} + \sqrt{D_{cip}(\text{center})^2 + f^2}]\hat{T}_{oip}(\text{center}) \quad (2.1)$$

Then, once the center of the pupil for each of the right eye 104(R) and the left eye 104(L) have been placed in space, the IPD can be obtained as the norm of the subtraction of the projected pupillary axis for the left eye and the right eye—as given by Equation 5 below:

$$\text{Interpupillary Distance (IPD)} = \|\vec{r}_{ip}^{\,d}(\text{left,center}) - \vec{r}_{ip}^{\,d}(\text{right,center})\| \quad (5)$$

Figure 7:
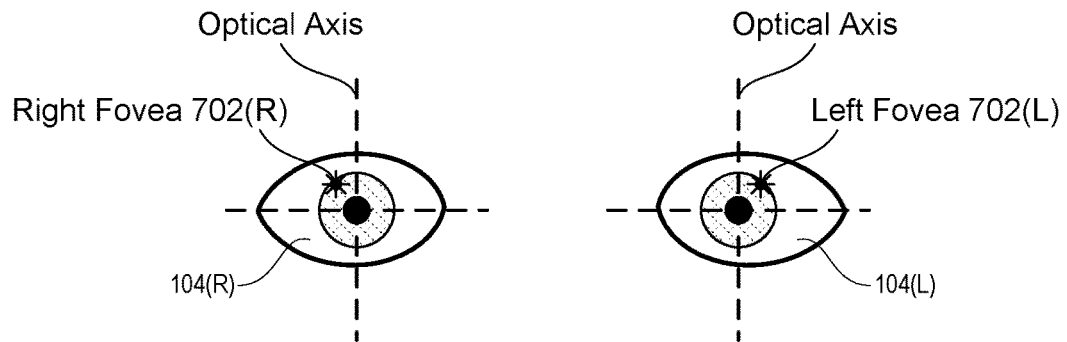
FIG. 7 illustrates exemplary positions of a user's right fovea and left fovea in relation to the optical axes of the user's right eye and left eye, respectively.

Turning now to FIG. 7, illustrated are exemplary positions of a user's right fovea 702(R) and left fovea 702(L) in relation to the optical axes of the user's right eye 104(R) and left eye 104(L), respectively. As can be seen from FIG. 7, the position of the fovea for each eye is eccentric (e.g., not centrally placed) regarding the optical axis of the corresponding eye. Generally speaking, the right fovea 702(R) tends to be positioned in the second quadrant for the right eye 104(R) whereas the left fovea 702(L) tends to be positioned in the first quadrant for the left eye 104(L). This is consistent with the illustrated positions of the fovea in FIG. 7. The fovea 702 is the specific region of the retina at which visual acuity is highest due to the user's retinal cones being particularly concentrated in this area. For this reason, the center of the user's field of vision for each eye is focused at the fovea for that eye. The result is that the user's visual axis passes through the center of the fovea 702 so that light from whatever object the user is currently focused on passes through the pupil and lens of the eye before ultimately striking the fovea 702.

Figure 8:
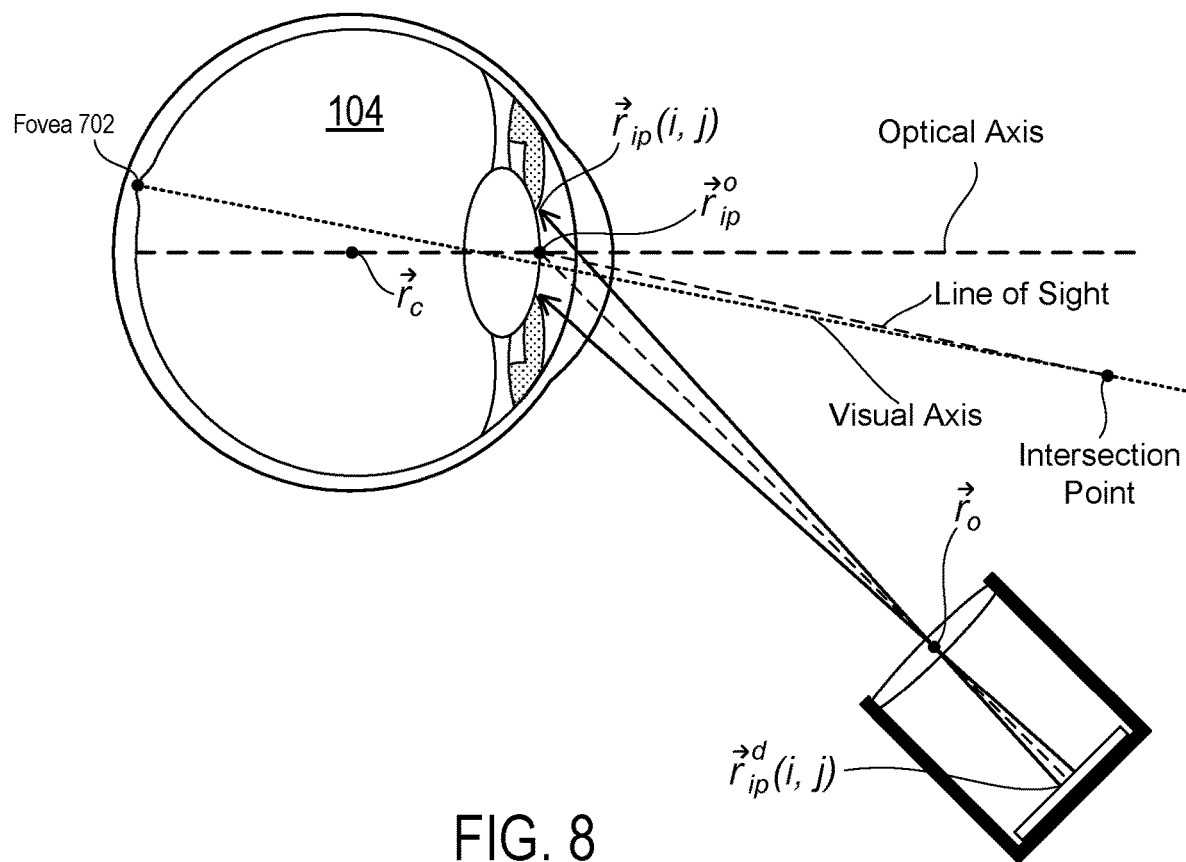
FIG. 8 illustrates a side view of a user's eye showing how the offset position of the user's fovea in relation to the optical axis results in the visual axis diverging from the optical axis.

Turning now to FIG. 8, illustrated is a side view of a user's eye 104 showing how the offset position of the user's fovea in relation to the optical axis results in the visual axis diverging from the optical axis. As illustrated, the fovea position being above the optical axis at the back of the user's eye results in the visual axis pointing down slightly. It should also be appreciated from the combination of FIGS. 7 and 8 that the visual axes of the user's eyes will also tent to be pointed inward slightly.

As shown in FIG. 8, a line of sight of the user extends from the center of the entrance pupil $\vec{r}_{ip}{}^O$ and intersects the visual axis at a singular intersection point. Accordingly, when the user is focused on an object at a particular accommodation plane, determining the user's line of sight may be adequate to determine where the user is focused. However, since the visual axis will be most closely directed at whatever object the user is focused on regardless of the depth at which the user is focused, conventional eye tracking methods that merely track the user's line of sight are inadequate for determining where the user is focused for all accommodation planes. By dynamically tracking the user's visual axis, the eye tracking systems disclosed herein are able to determine a vergence in space at which the user is currently focused independent of what accommodation plane that vergence falls on.

In some instances, convention eye tracking systems estimate the user's line of sight by observing the Purkinje reflections with the addition of head tracking information. Unfortunately, even an accurate estimation of the user's line of sight may be insufficient to accurately determine the depth at which the user is focusing within the real-world environment. This is because the user's line of sight and the user's visual axis (which actually propagates to the user's fovea) only converge at a single depth plane. Although the visual axis is illustrated as a straight and continuous line in FIG. 8, it will be appreciated by one skilled in the art that the actual optical path of the visual axis is more aptly described as a line connecting the fixation point (at which the user is focused) to the first and second nodal points (not shown in FIG. 8) and the user's Fovea.

Figure 9:
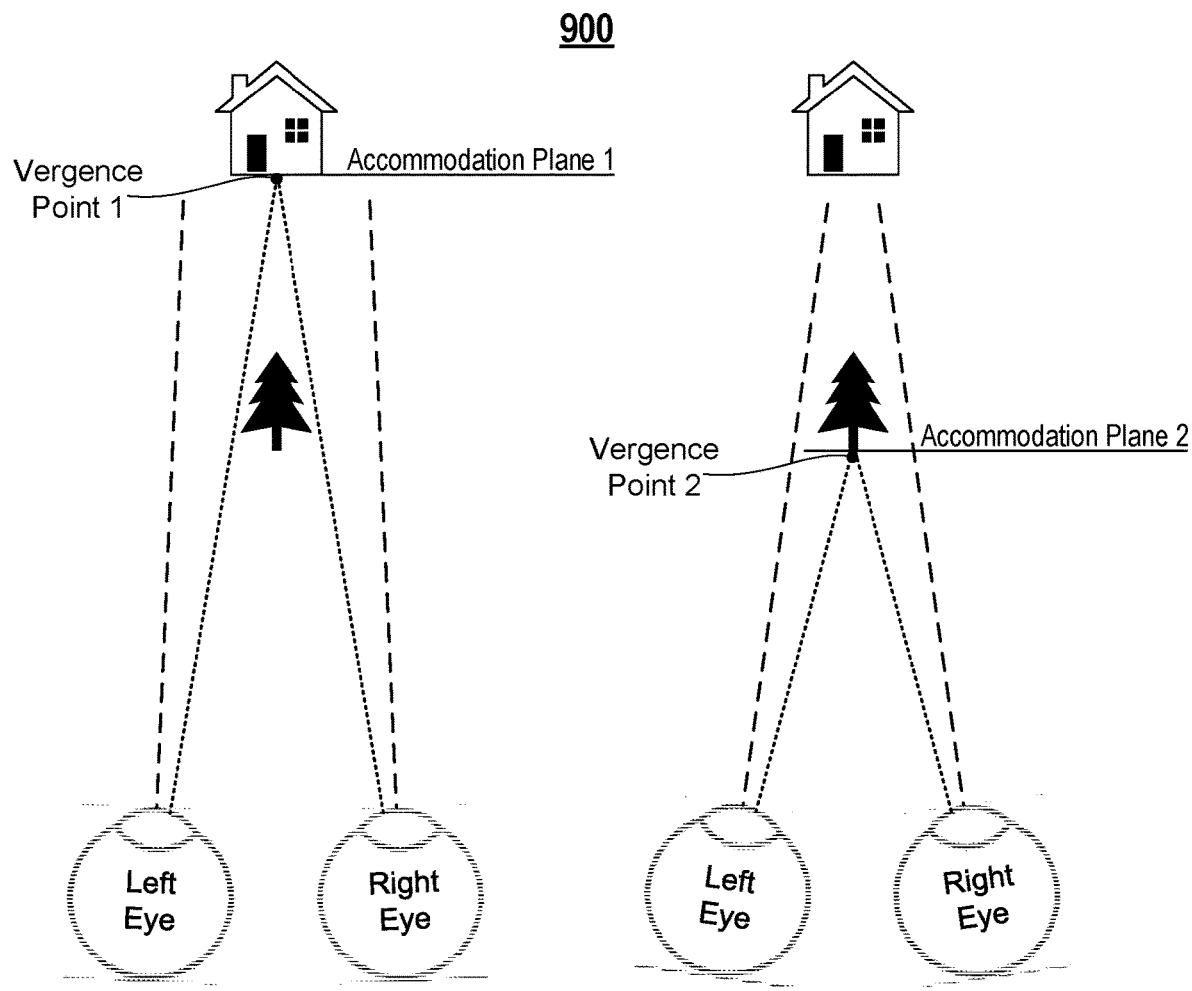
FIG. 9 illustrates an exemplary environment in which a user may perform vergence movements of the eyes to shift a vergence of the two visual axes (e.g., a focal point) from a first accommodation plane to a second accommodation plane.

Turning now to FIG. 9 to demonstrate the foregoing point, illustrated is an exemplary environment 900 in which a user may perform vergence movements of the eyes to shift a vergence of the two visual axes (e.g., a focal point) from a first accommodation plane to a second accommodation plane. It will be appreciated that vergence movements are closely connected to accommodation of the eye. Under normal conditions, changing the focus of the eyes to look at objects at different distances will automatically cause vergence and accommodation. This is sometimes referred to as the accommodation-convergence reflex. Generally speaking, a vergence movement comprises the simultaneous movement of a binocular system (e.g., the user's two eyes) in opposite directions to perform a depth operation. When the user performs a vergence movement to change a focus from a distant object to a relatively closer object, the eyes rotate toward each other (i.e., the eyes perform a convergence movement). When the user performs a vergence movement to change a focus from a close object to a relatively more distant object, the eyes rotate toward away from each other (i.e., the eyes perform a divergence movement).

The left side of FIG. 9 shows the focus of the user on a house at "Accommodation Plane 1" that is relatively farther from the user than "Accommodation Plane 2." Thus, on the right side of FIG. 9 the visual axes each reach a common vergence point that resides on the house whereas a vergence of the lines of sight (which conventional systems track) does not actually represent where the user is focused. The left side of FIG. 9 shows the focus of the user on a tree that is at an Accommodation Plane 2 that is relatively closer to the user. Thus, on the left side of FIG. 9 the visual axes each reach a common vergence point that resides on the tree whereas a vergence of the lines of sight again does not actually represent where the user is focused.

In some embodiments, visual axis offset data is used to continuously track the visual axis of the user's eyes 104. For example, it can be appreciated that by deploying various techniques as described above, the eye tracking systems described herein may continually determine the optical axis and the orientation Rot($\phi$, $\theta$) of the Iris-Pupil plane 206. Exemplary visual axis offset data defines a spatial relationship between the optical axis of the eye and/or the orientation Rot($\phi$, $\theta$) of the Iris-Pupil plane 206 of the eye 104. Thus, upon determining the optical axis and/or the orientation Rot($\phi$, $\theta$) for a particular eye, the eye tracking systems described herein may utilize the visual axis offset data to calculate the visual axis.

Figure 10:
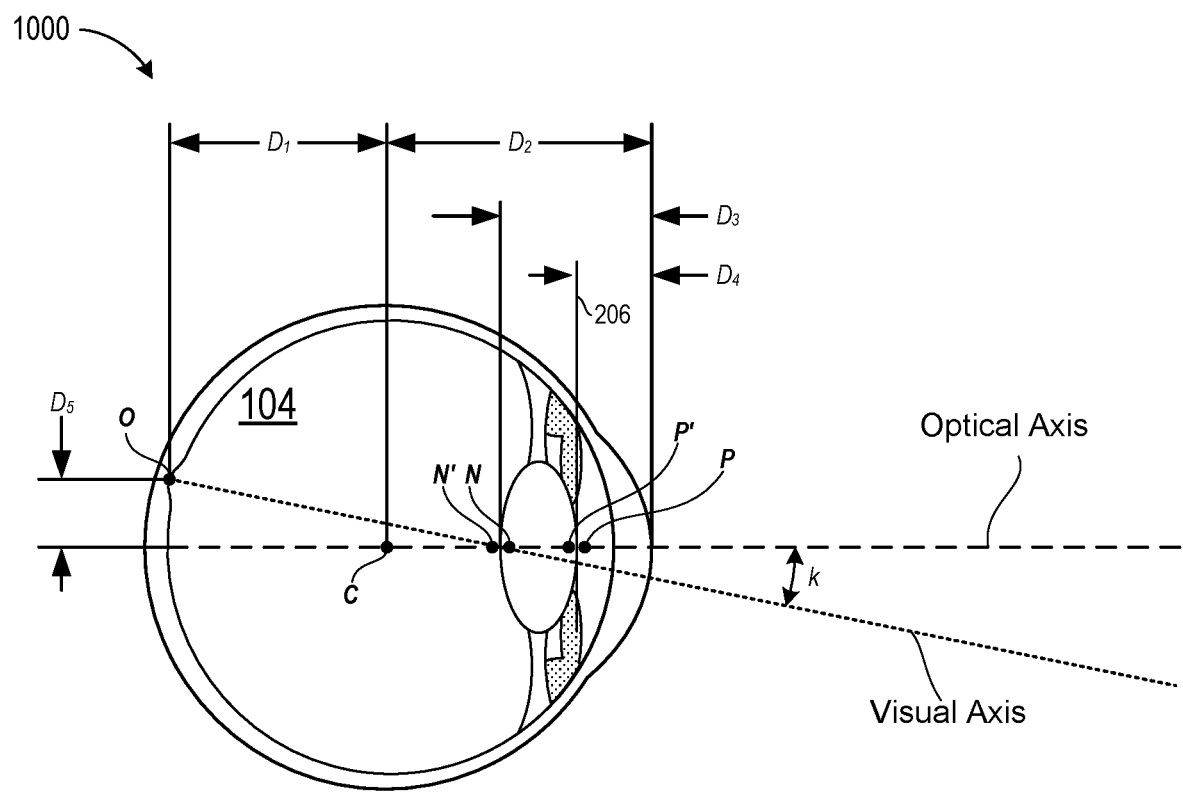
FIG. 10 illustrates an exemplary anatomical eye model that defines geometrical relationships between various portions of an eye.

Turning now to FIG. 10 to demonstrate the foregoing point, illustrated is an exemplary anatomical eye model 1000 that defines geometrical relationships between various portions of an eye 104. As illustrated, the anatomical eye model 1000 defines: a horizontal dimension $D_1$ from the center of the eye 104 (i.e., the point labeled "C") to the fovea (i.e., the point labeled "O"); a horizontal dimension $D_2$ from the center of the eye 104 (i.e., the point labeled "C") to the front surface of the cornea; a horizontal dimension $D_3$ from the front surface of the cornea to a rear surface of the lens of the eye 104 (i.e., the point labeled "N'"); a horizontal dimension $D_4$ from the front surface of the cornea to a front surface of the lens of the eye 104 (i.e., the point labeled "P'"); and a vertical dimension $D_5$ from the center of the eye 104 (i.e., the point labeled "C") to the fovea (i.e., the point labeled "O"). In various implementations, these or other dimensions may be used to define the visual axis offset data. The values for the relevant dimensions may be taken from any variety of suitable models that include, but are not limited to, the Gullstrand model, the Arizona model, the Liou-Brennan model, and/or the Navarro model.

As illustrated in FIG. 10, the visual angle $\widehat{VA}_{N'}$ line may be represented as a vector that extends from the fovea at point "O" to the point labeled "N'" that represents the rear surface of the lens of the eye 104. The visual angle $\widehat{VA}_{N'}$ line subtends an angle k from the optical axis and can be defined based on Equation 6 below:

$$\widehat{VA}_{N'} = \frac{\vec{r}_{N'} - \vec{r}_O}{|\vec{r}_{N'} - \vec{r}_O|} = \frac{\vec{R}_{N'O}}{|\vec{R}_{N'O}|} \tag{6}$$

where $\vec{r}_{N'}$ is the image nodal position and $\vec{r}_O$ is the central position of the fovea 702. In general, literature has reported that the angle k ranges between 4 and 8 degrees.

It can be appreciated that by applying the definition of nodal points to the exemplary anatomical eye model 1000, there is a conservation of the angles regarding the optical axis. For this reason, the line that starts from the object nodal point "N" can be described by Equation 7 given below:

$$\vec{VA}_N = \vec{r}_N + D_{SN} \widehat{VA}_{N'} \tag{7}$$

where $\vec{r}_N$ is the object nodal point and $D_{SN}$ is the distance between object nodal point "N" and the stimulus (e.g., object) upon which the user is focused.

Based on the foregoing, it can be appreciated that the rotation calculated from the minimization technique described in relation to Equation 4 as applied over $\vec{VA}_N$ regarding to the center $\vec{r}_c$ of the eye 104 must be equal to the vector joining the stimulus and the target as given by Equation 8 below:

$$\text{Rot}(\phi,\theta)(\vec{R}_{SC}+\|\vec{R}_{SN}\|\widehat{VA}_{N'})=\vec{R}_{SC} \qquad (8)$$

It can be appreciated that the various nodal points that are illustrated in FIG. 10 and described throughout this document will change in relative position as the user focuses on object at different accommodation planes. For example, in focusing on objects at different depths, the lenses of the eyes are of course caused to change shape. As these shape changes occur the rear surface of the lens may shift between the nodal point labeled "N" and the nodal point labeled "N'" whereas the front surface of the lens may shift between the nodal point labeled "P" and the nodal point labeled "P'." Notable, these changes in the shape of the lens and positions of the nodal points that are triggered by accommodation changes have an insignificant impact on the orientation and placement of the visual axis within the eye. For this reason, in various embodiments the visual axis offset data may define relationships between the optical axis of the eye in a manner that is independent of the current accommodation plane upon which the user is focused.

Figure 11:
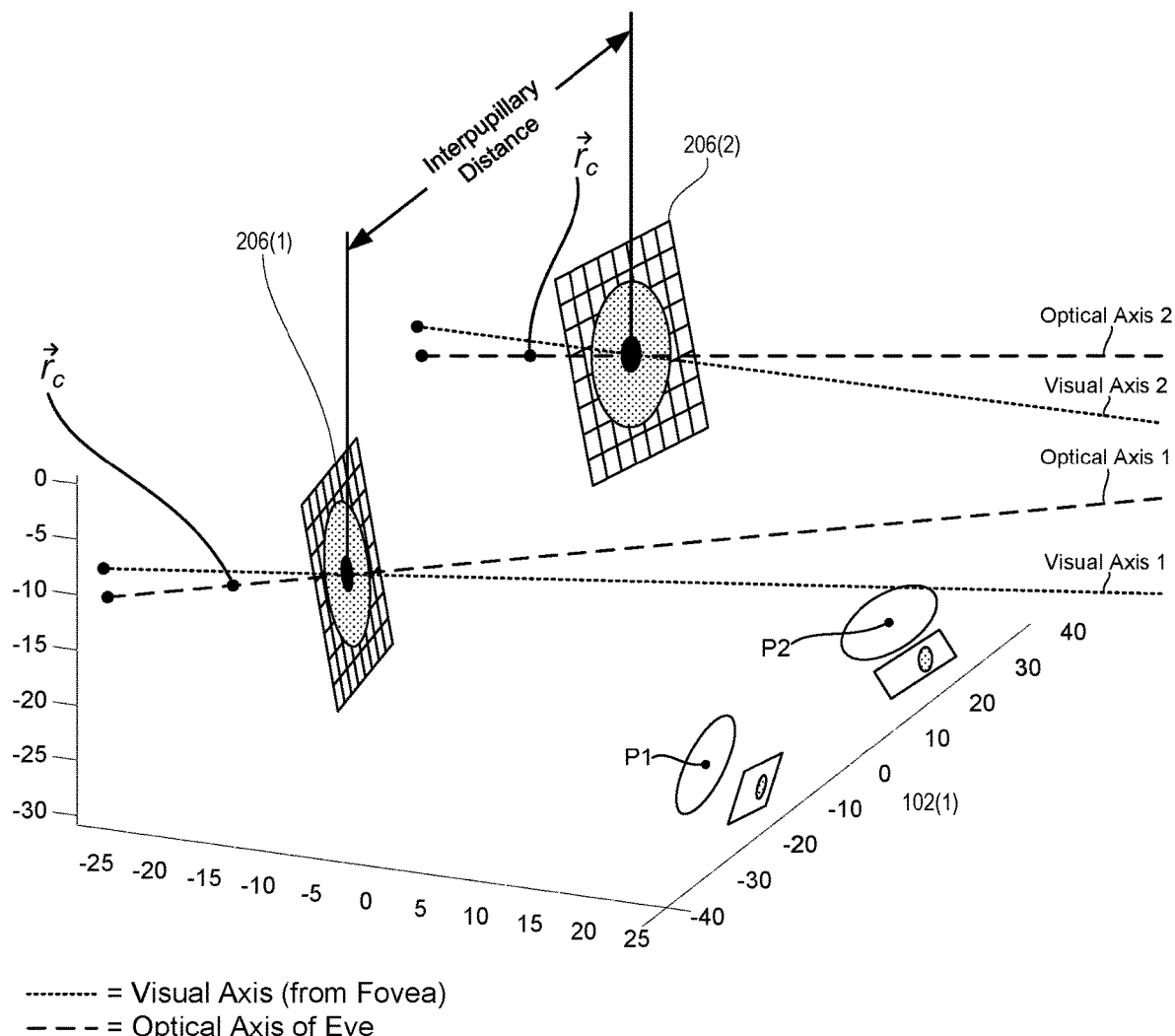
FIG. 11 illustrates a pair of visual axes that are determinable based on visual axis offset data defining a spatial relationship between the individual visual axes and corresponding optical axes.

To illustrate the foregoing, FIG. 11 illustrates a pair of visual axes that are determinable based on visual axis offset data defining a spatial relationship between the individual visual axes and corresponding optical axes. As illustrated in FIG. 10, upon determining the optical axis and the orientation $\text{Rot}(\phi, \theta)$ of the Iris-Pupil plane 206 for each eye 104, the eye tracking systems described herein can then calculate the visual axes for each eye. These calculations may be done continuously based on visual axis offset data that defines a spatial relationship between the optical axis of the eye and/or the orientation $\text{Rot}(\phi, \theta)$ of the Iris-Pupil plane 206 of the eye 104.

In some embodiments, upon calculating the pair of visual axes for a particular moment in time, the eye tracking system may then determine the vergence of the visual axes in space. The two visual axes will rarely actually converge in space perfectly. This is because although generally modeled as such, the human body does not behave perfectly symmetrically. Rather, there are slight variations in where the two eyes will actually be pointed in a real-life scenario. As such, in various embodiments, the vergence is calculated by performing minimization techniques with respect to both of the two visual axes. Stated plainly, based on the assumption that the two visual axes will be closest to actually converging at or very near the point in space that the user is actually focusing, the techniques described herein may determine the vergence point to be the point in space at which the visual axes are closest together.

Figure 12:
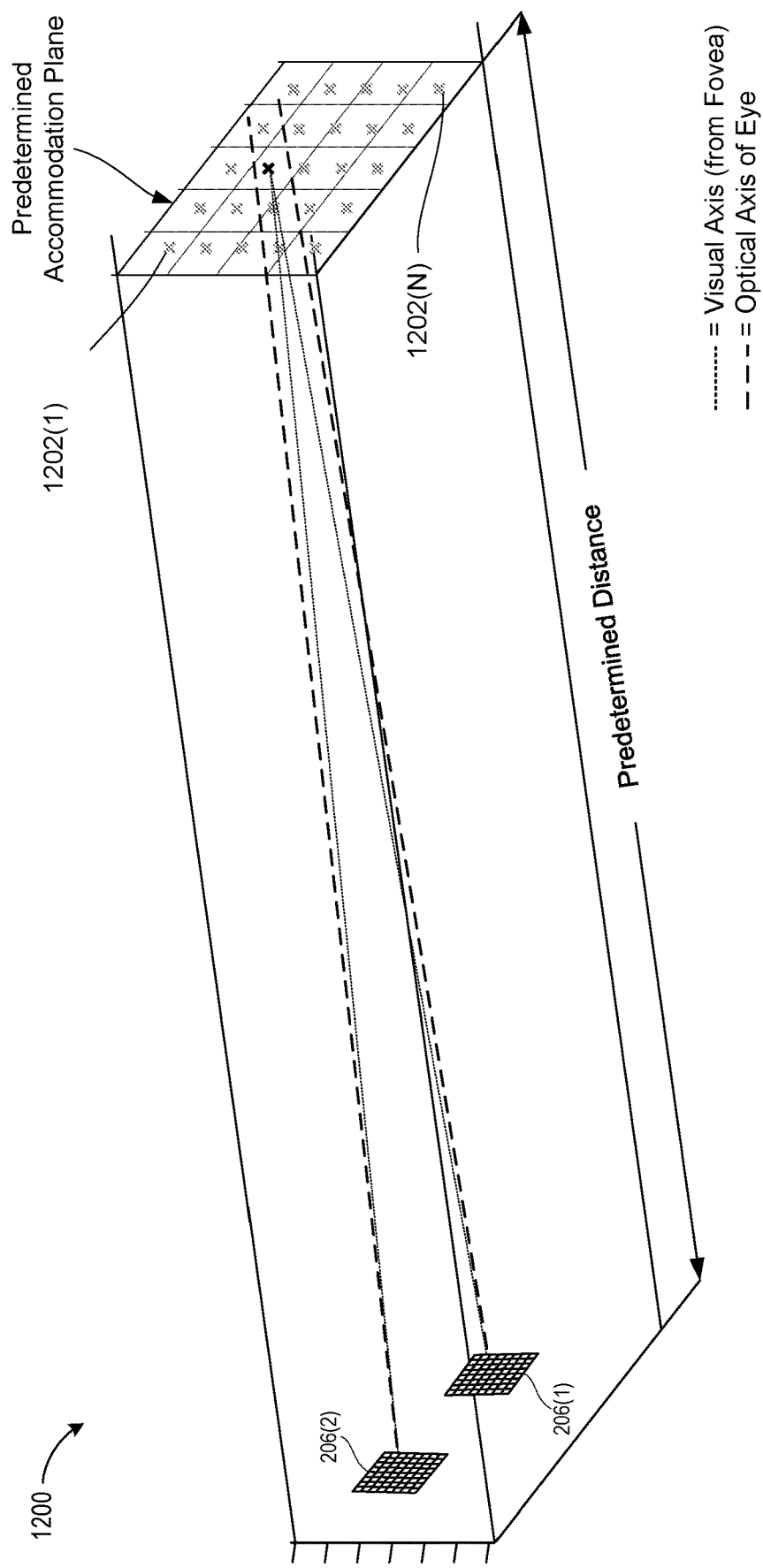
FIG. 12 illustrates an exemplary environment in which a plurality of virtual stimuli can be sequentially generated at a predetermined accommodation plane for performance of a user-specific calibration process.

Turning now to FIG. 12, illustrated is an exemplary environment 1200 in which a plurality of virtual stimuli 1202 can be sequentially generated at a predetermined accommodation plane for performance of a user-specific calibration process. As illustrated, the plurality of virtual stimuli 1202 may be uniformly spaced in a predetermined grid shaped pattern at a predetermined accommodation plane. The predetermined accommodation plane may be spaced a predetermined distance in front of the NED device 100 (not shown in FIG. 12). As a specific but non-limiting example, the predetermined accommodation plane may be spaced a distance of two meters in front of the user. It should be appreciated that as the stimuli are virtual in nature, the virtual stimuli may be generated at the accommodation plane of two meters by a display element (e.g. a waveguide display) that is located at a much closer distance to the user's eyes than two meters. For example, modern NED devices are capable of rendering images at a plurality of accommodation depths all from a transparent display that is positioned between fifteen and thirty-five millimeters from the user's eyes.

To perform the user-specific calibration process, individual ones of the virtual stimuli 1202 are sequentially rendered (e.g., one at a time) to cause the eyes of the subject to rotate so that the visual axes converge at the currently rendered virtual stimuli. Then, the discrepancy between the orientations $\text{Rot}(\phi, \theta)$ of the Iris-Pupil plane 206 as the user's focus changes between the individual stimuli can be exploited to determine the optimum visual axis for that specific user. Stated plainly, the visual axis offset data can be customized for the specific user.

During performance of the user-specific calibration process, the orientation $\text{Rot}(\phi, \theta)$ of the Iris-Pupil plane 206 while the user is focused on each individual one of the virtual stimuli 1202. Then, various error minimization techniques can be deployed to determine what the optimum visual axis is for the user. As a specific example of such an error minimization technique is given by Equation 9 as shown below:

$$Err(\widehat{VA}_{N'}) = \sum_{i=1}^{m}\sum_{j=1}^{n}\|Rot(\phi, \Theta, i, j)(\vec{R}_{SC}(i, j) + \|R_{SN}\|\widehat{VA}_{N'}) - \vec{R}_{SC}(i, j)\|^2 \qquad (9)$$

This type of minimization technique has the advantage that it is convex and that the visual axis can be calculated analytically. Furthermore, while the coordinates of the stimulus are known $\vec{r}_S$, the values of the center of rotation of the eye $\vec{r}_C$, and the object nodal point $\vec{r}_N$ can be either introduced following anatomical models like Gullstrand, Arizona, Liou-Brennan or Navarro among others, or otherwise, a global minimization can be performed for custom values.

Figure 13:
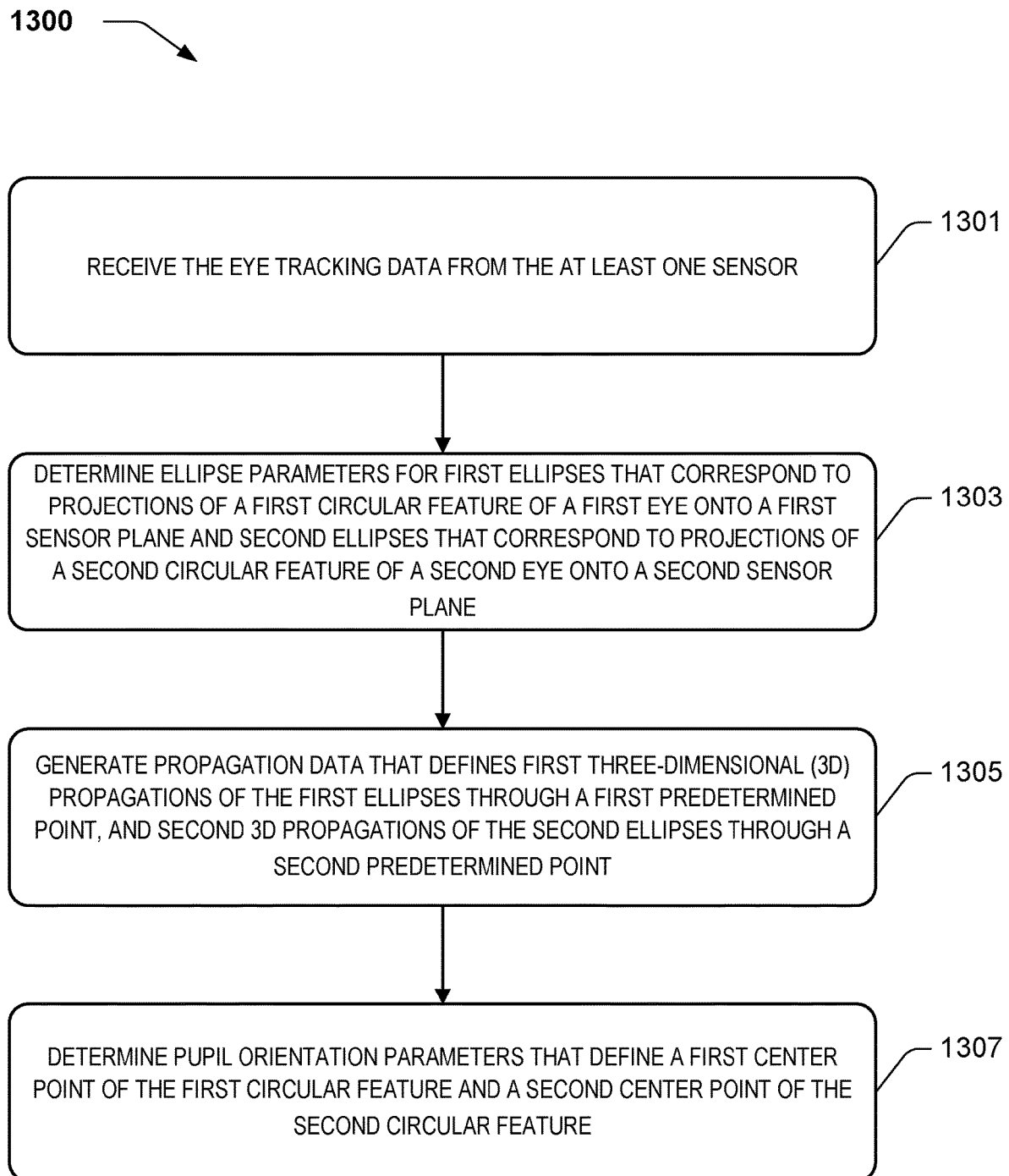
FIG. 13 is a flow diagram of a process 1300 to generate propagation data that defines three-dimensional (3D) propagations from ellipses detected at a sensor plane to determine pupil orientation parameters.

Turning now to FIG. 13, a flow diagram is illustrated of a process 1300 to generate propagation data that defines three-dimensional (3D) propagations from ellipses detected at a sensor plane to determine pupil orientation parameters. The process 1300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 1301, an eye tracking system receives eye tracking data from at least one sensor that is directed toward at least one eye. As described herein, the at least one sensor can be a camera that includes at least one lens through which light passes prior to striking an image sensor (e.g., a CMOS sensor or any other suitable type of image sensor). The eye tracking data may be in the form of pixel data that defines an image of circular feature(s) of the at least one eye. In an exemplary embodiment, the eye tracking data includes images of both a right eye and a left eye of a user of a NED device. Moreover, as described above, the images may include elliptical representations of the circular features of the eyes due to a sensor plane in each of the sensors being angularly offset from an Iris-Pupil plane of the respective eye that each sensor is tracking. In various implementations, the eye tracking system may select between tracking the pupil vs the iris depending on physical characteristics of the user. For example, if the user has very dark irises, there may be very little contrast between the user's pupils and the user's irises. The result of this lack of contrast may be that tracking the user's pupil is impractical. In such a case, the eye tracking system may use the user's iris to perform the eye tracking since there will be greater contrast between the user's iris and the sclera (commonly referred to as the "white of the eye") of the user's eyes than between the user's "dark" iris and the user's dark pupil.

At block 1303, the eye tracking system may determine ellipse parameters for first ellipses that correspond to projections of a circular feature of a first eye (e.g., a right eye) onto a first sensor plane and also for second ellipses that correspond to projections of a circular feature of a second eye (e.g., a left eye) onto a second sensor plane. For example, the system may determine, for each of the first ellipse and the second ellipse, a center-point for the ellipse, a semi-major axis of the ellipse, a semi-minor axis of the ellipse, and an angular rotation of the ellipse with respect to a sensor plane.

At block 1305, the eye tracking system may generate propagation data that defines first 3D propagations of the first ellipse back toward the first eye and second 3D propagations of the second ellipse back toward the second eye. In various embodiments, each of the 3D propagations may comprise a series of lines that all begin at a point along the perimeter of an ellipse that is detected on a sensor plane and then propagation through a predetermined point back toward the eye of a user. It should be appreciated that the 3D propagations described herein may be generally understood as mathematical representations of rays of light rather than actual projections of light that are emitted from the eye tracking system toward the user. Notable, a major benefit of the eye tracking systems and techniques disclosed herein is that light need not be emitted for implementations—rather the eye tracking data can be generated based exclusively on ambient light.

At block 1307, the eye tracking system may utilize the propagation data to determine pupil orientation parameters that define various characteristics of the user's eye(s). Exemplary pupil orientation parameters may define optical axes for one or both of the user's eyes (e.g., an axis of an eye lens), visual axes for one or both of the user's eyes (e.g. axes that extend from the fovea through the lens and into the real-world environment), rotational angles of the user's eyes (e.g. an angle of rotation between a semi-axis of an ellipse and a horizontal axes of the sensor), Iris-Pupil Planes of the user's eyes (e.g. a plane on which the pupil resides), center points for the user's eyes (e.g., a point at which the optical axis (or alternatively the visual axis) intersects the Iris-Pupil plane). Additionally, or alternatively, the pupil orientation parameters may define various other characteristics of the user's eyes.

As described above, in various embodiments the eye tracking system may utilize the pupil orientation parameters and visual axis offset data to determine visual axes that correspond to each of the eyes of the user. Then, the eye tracking system may perform various minimization techniques to determine a vergence between the two visual axes. The determined vergence then represents a focal point within the real-world environment at which the user is currently focused. The vergence may be determined by calculating the point in space at which the two visual axes come the closest to actually converging in pure mathematical terms since in a practical sense the calculated visual axes for a user will rarely (if ever) actually converge.

Turning now to FIG. 14, illustrated is an exemplary computing environment 1400 in which a user 1402 is providing user input instructions to a NED device 1404 in the form of combinations of user gaze direction and predetermined facial gestures. As illustrated, the NED device 1404 is rendering a virtual menu 1406 within a field-of-view of the user 1402. The virtual menu 1406 may include various computer-generated images—one or more of which may be selected and/or manipulated by the user 1402 by providing user input instructions. In the illustrated embodiment, the virtual menu 1406 includes a plurality of menu items 1408 that are individually selectable using the techniques described herein. For example, user input instructions may be provided by the user 1402 to the NED device 1404 by gazing at (e.g., focusing his attention on) an individual computer-generated image within the computer-generated scene. Additionally, or alternatively, user input instructions may be provided by the user 1402 to the NED device 1404 by deliberately performing one or more predetermined facial gestures such as, for example, deliberately blinking a right eye only, deliberately blinking a left eye only, deliberately blinking a left eye only—twice within a threshold amount of time, or deliberately blinking both eyes. Moreover, user input instructions may be provided by the user 1402 to the NED device 1404 by deliberately focusing on individual computer-generated images and then deliberately performing some facial gesture. As a specific example, a user wearing a NED device as described herein may use their gaze direction to controllably place a curser over a graphical control element within a virtual menu and then perform a double left blink facial gesture to activate the graphical control element.

The NED device 1404 includes an eye tracking system that is configured to continually track movement of the user's eyes. In some embodiments, the eye tracking system of the NED device 1404 is configured with at least one camera directed toward each of the user's eyes to generate eye tracking data. The eye tracking data may be used in an ocular rotation model as described herein to accurately track the user's visual axis. Additionally, or alternatively, the eye tracking data may be glint based eye tracking data as described above. In some embodiments, the NED device 1404 continually tracks a visual axis of one or both of the user's eyes. As illustrated, the NED device 1404 is shown to be continually tracking each of a first visual axis of the user's right eye and a second visual axis of the user's left eye. As further illustrated in FIG. 14, the first visual axis and the second visual axis are shown as converging upon a second menu item 1408(2) that is being rendered by the NED device 1404 as a part of the virtual menu 1406. In some embodiments, the NED device 1404 is configured to identify this vergence point using various techniques such as, for example, those described above with respect to FIGS. 9 and 12.

The NED device 1404 is configured to render computer generated images (CGIs) in front of a user's eye(s). The NED device 1404 can be used for augmented reality (AR) and/or virtual reality (VR) applications. In implementations where the NED device 1404 is an AR Head Mounted Device (HMD) device, a display component 1405 may protrude into the user's field of view. An exemplary type of display component may be a transparent display element that enables the user to see concurrently both the real-world environment surrounding her as well as AR content generated by the display component.

In some embodiments, the NED device 1404 may be configured to provide real-time visual feedback to the user 1402 in response to a current direction of the user's eye gaze and/or a current convergence point of the user's visual axis. For example, as illustrated, the virtual menu 1406 includes four individual menu items 1408—the first menu item labeled 1408(1), the second menu item labeled 1408(2), and so on. In response to the user 1402 focusing upon any individual one of the menu items 1408, some visual feedback may be provided such as, for example, changing a visual appearance of the focused upon menu item 1408 to distinguish the other menu items 1408. In the illustrated embodiment, for example, the second menu item 1408(2) is being rendered in a relatively larger and bolder font as compared to the other menu items 1408. In this way, the NED device 1404 is providing the user 1402 with real-time visual feedback that intuitively indicates which computer-generated image the user's current gaze direction is directed at. It will be appreciated that the gaze direction of the user can in a way be analogized to a mouse curser element of a typical operating system. For example, the user focusing on a specific user interface element (e.g., graphical control element) may be treated similar to the user hovering a mouse curser over the specific user interface element.

Additionally, or alternatively, a "focal location" indicator 1410 may be rendered dynamically to indicate a current location within the computer-generated scene (e.g., the virtual menu 1406 in the illustrated embodiment) at which a gaze direction of the user is directed toward. For example, if the user focuses his or her attention on a particular graphical control element that a focal location indicator may be superimposed over that particular graphical control element similar to how a mouse curser graphical element may be superimposed over various graphical control elements in response to a user moving a physical hardware mouse. The "focal location" indicator 1410 may serve as a visual user feedback in much the same way as a "mouse curser element" does when visually rendered in typical operating system environments. In the illustrated embodiment, the "focal location" indicator 1410 is shown as an "X" that is marking the spot at which the user 1402 is currently focusing. However, any other suitable indicator may be used such as, for example, a "pointer" element. Some embodiments omit any sort of "focal location" indicator 1410 as described herein.

In some embodiments, one or more portions of a virtual scene that is being generated by the NED device 1404 may be anchored (e.g., "pinned") to a coordinate system 1412 that is associated with a real-world environment 1414. In this way, the user 1402 may be enabled to look at some portion of the real-world environment 1414 without his view being obstructed by the virtual scene. For example, as illustrated, the user 1402 is performing some task within a work space 1416 that exists within the real-world environment 1414. As further illustrated, the virtual menu 1406 is a part of the virtual scene being rendered by the NED device 1404 and is anchored above the work space 1416 by reference to the coordinate system 1412. In this way, the user 1402 is able to look down at the work space 1416 without the virtual menu 1406 obstructing the user's 1402 view. Moreover, if ever the user 1402 desired to view and/or manipulate the virtual menu 1406 that is being generated by the NED device 1404, the user 1402 can simply look up away from the work space 1416 to bring the virtual menu 1406 back into his field-of-view (FOV).

FIGS. 15A through 15E are related figures that together illustrate an exemplary sequence of eye movements and facial gestures that may be performed to provide user input instructions to a NED device that is configured to implement various techniques disclosed herein. FIGS. 15A through 15E are described in the context of a scenario where a person is performing a complex task such as a surgical procedure that requires uninterrupted use of the person's hands. Although not limited to such a scenario, an appreciation of various aspects of the invention is readily gained through a discussion of an example in such a context. The techniques described herein are usable to facilitate "hand-free" user input instructions in any other suitable context.

Figure 15A:
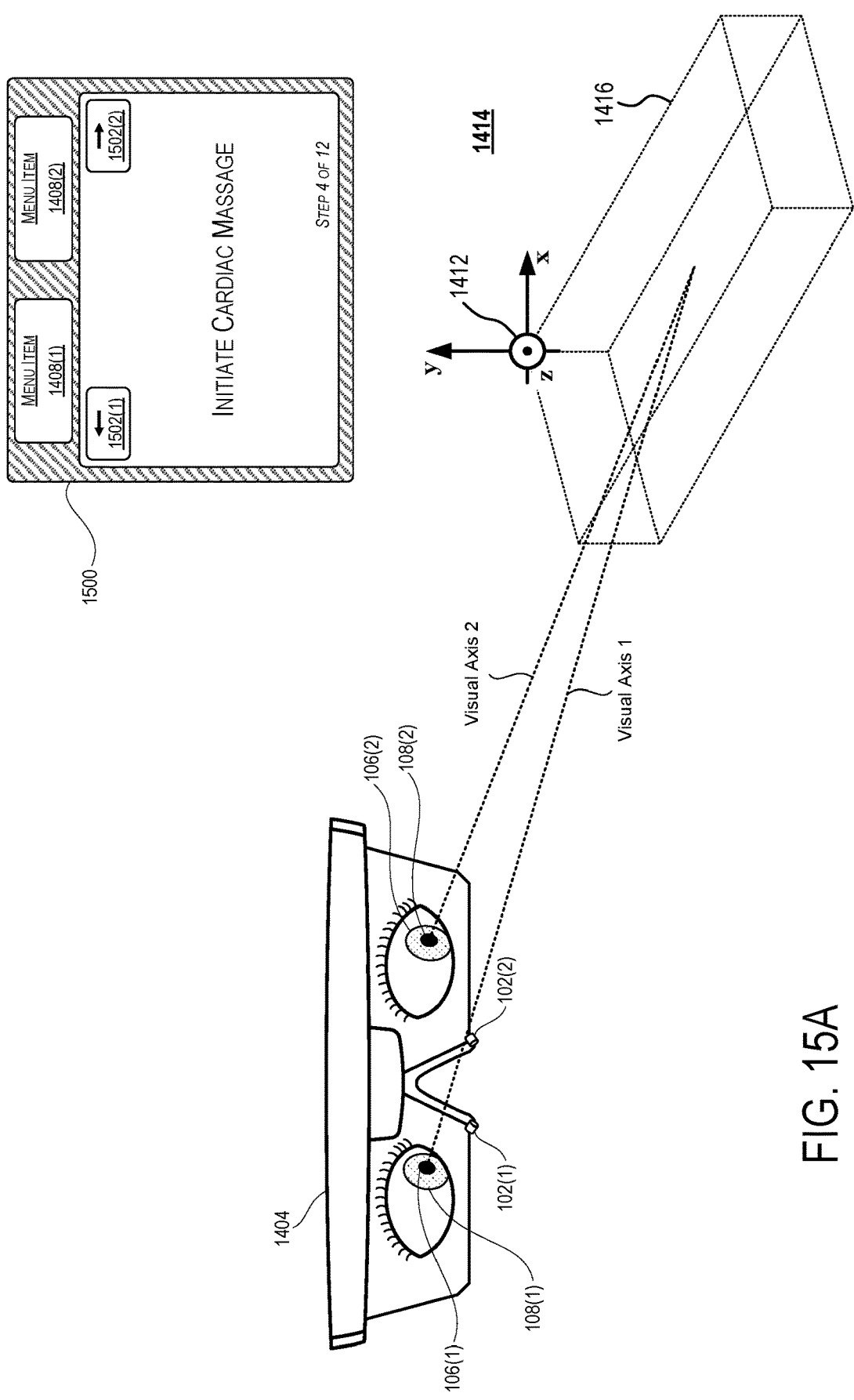
FIG. 15A illustrates a NED device that is rendering a virtual scene while tracking eye movements of the user to continually monitor a gaze direction.

Turning now to FIG. 15A, illustrated is a NED device 1404 that is rendering a virtual scene 1500 while tracking eye movements of the user to continually monitor a gaze direction of the user. In this way, the NED device 1404 may be actively determining whether the user is focusing their attention on any particular user interface elements—and if so which one. The NED device 1404 may also be monitoring for predetermined facial gestures such as single eye blinks, rapid successions of single eye blinks (e.g., blinking the same eye two times within a predetermined threshold time-period), or double eye blinks (e.g., blinking both eyes concurrently). As illustrated, each of a first visual axis and a second visual axis are shown to be directed toward a work space within a real-world environment 1414 rather than being directed toward the virtual scene 1500—or any particular graphical element thereof. For example, the user of the NED device 1404 may be a surgeon that is actively performing a surgical procedure on a patient within the workspace 1416.

In the illustrated embodiment, the virtual scene 1500 is anchored above the work space 1416 based on a coordinate system 1412. In some embodiments, the coordinate system 1412 may be defined in relation to the real-world environment 1414. For example, the coordinate system 1414 may be statically located within the real-world environment 1414 so that the virtual scene 1500 does not move in relation to the work space 1416 when the user looks up, down, left, right, or even walks away from or up to the work space 1416. In this way, the user may be able to look down at the work space 1416 as shown in FIG. 15A without the virtual scene 1500 obstructing the user's view. In some embodiments, the coordinate system 1412 may be defined in relation to the NED device 1404. For example, the coordinate system 1414 may be statically located with respect to the NED device 1404 so that the virtual scene 1500 does not move in relation to the user's head—assuming the NED device 1404 is securely mounted to the user's head.

In the illustrated embodiment, the virtual scene 1500 is shown to be displaying an individual step of a sequence of steps. Specifically, as indicated in the lower right of the virtual scene 1500 the fourth step of a twelve-step sequence is being displayed—the fourth step being to "initiate cardiac massage." Thus, for purposes of the present discussion of FIGS. 15A through 15E, correctly performing the task requires uninterrupted use of the user's hands. With respect to user input elements, the virtual scene 1500 includes one or more menu items 1408 that are selectable as graphical control elements. The virtual scene 1500 also includes a "next step" button 1502(2) and a "previous step" button 1502(1)—each of which are also selectable as graphical control elements to toggle forward or backwards through the sequence of steps. The menu items 1408 and the buttons 1502 are selectable as described below.

Turning now to FIG. 15B, this drawing is similar to FIG. 15A with the exception that the user's gaze direction has changed from being on the work space 1416 to being focused on the virtual scene 1500. More specifically, the user is focusing his or her attention on the portion of the virtual scene 1500 at which instructions for performing the fourth step is being rendered. Since the virtual scene 1500 is anchored above the work space 1416 based on a coordinate system 1412, it can be appreciated that the user can look up to the virtual scene 1500 at his or her leisure to quickly view an instruction and then look back down toward the task being performed within the work space 1416.

Figure 15C:
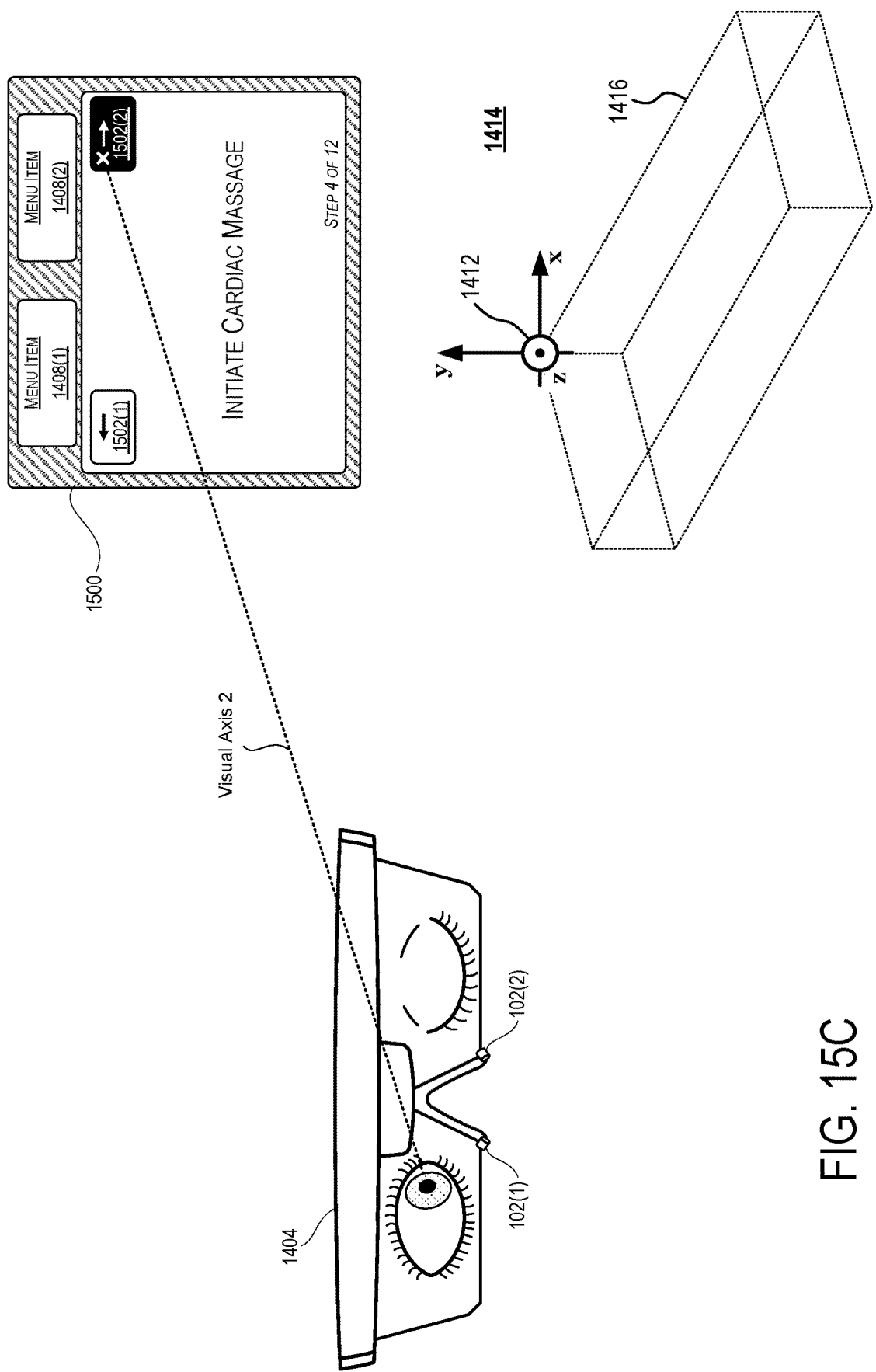
FIG. 15C is similar to FIG. 15B with the exception that the user's gaze direction has changed from being on a first portion of the virtual scene to a second portion of the virtual scene.

Turning now to FIG. 15C, this drawing is similar to FIG. 15B with the exception that the user's gaze direction has changed from being on the portion of the virtual scene 1500 at which instructions for performing the fourth step is rendered to being focused on the "next step" button 1502(2). In the illustrated embodiment, the NED device 1404 is configured to provide the user with real time visual feedback that is responsive to changes in the user's gaze direction. For example, as illustrated, the NED device 1404 is deploying an eye tracking system to actively determine in real time that the user gaze is focused upon a particular graphical element (in this case the "next step" button 1502(2)) and is responding to this determination to visually distinguish the particular graphical element from other graphical elements. For example, the NED device 1404 may alter a color of the particular graphical element to visually indicate that the user's gaze is hovering over (e.g., is focuses on) this particular graphical element. Additionally, or alternatively, the NED device 1404 may actively render a "curser" graphical element that dynamically moves around within the virtual scene based on the user's gaze direction. Similar to typical computing systems that utilize mouse hardware components, the location of the "curser" graphical element that the NED device renders is to serve as a visual signal that defines the point within the scene where user inputs are to take place.

While the user's gaze remains focused on the particular element, the user may perform one or more predetermined facial gestures to provide user input instructions to the NED device 1404. As illustrated, the user is deliberately blinking his or her left eye while retaining focus on the "next step" button 1502(2) to provide user input instructions in the form of a combinations of user gaze direction and a predetermined facial gesture. For purposed of the present discussion of FIGS. 15A through 15E, presume that the combination of focusing on a particular graphical element and then deliberately blinking a left eye is interpreted by the NED device 1404 similarly to how a WINDOWS-based operating system would interpret hovering a mouse curser over the particular graphical element and then clicking and releasing a left mouse button (i.e., on a physical hardware mouse). Specifically, the combination of the user gazing at the "next step" button 1502(2) and then blinking the left eye is interpreted as an instruction to select the "next step" button 1502(2). Thus, the NED device 1404 may respond to this "hands-free" user input instruction by advancing to the fifth step of the twelve-step sequence. Further presume that the combination of focusing on a particular graphical element and then deliberately blinking a left eye two times within a threshold period of time (e.g.,) is interpreted by the NED device 1404 similarly to how a WINDOWS-based operating system would interpret hovering a mouse curser over the particular graphical element and then double clicking a left mouse button (i.e., on a physical hardware mouse).

Figure 15D:
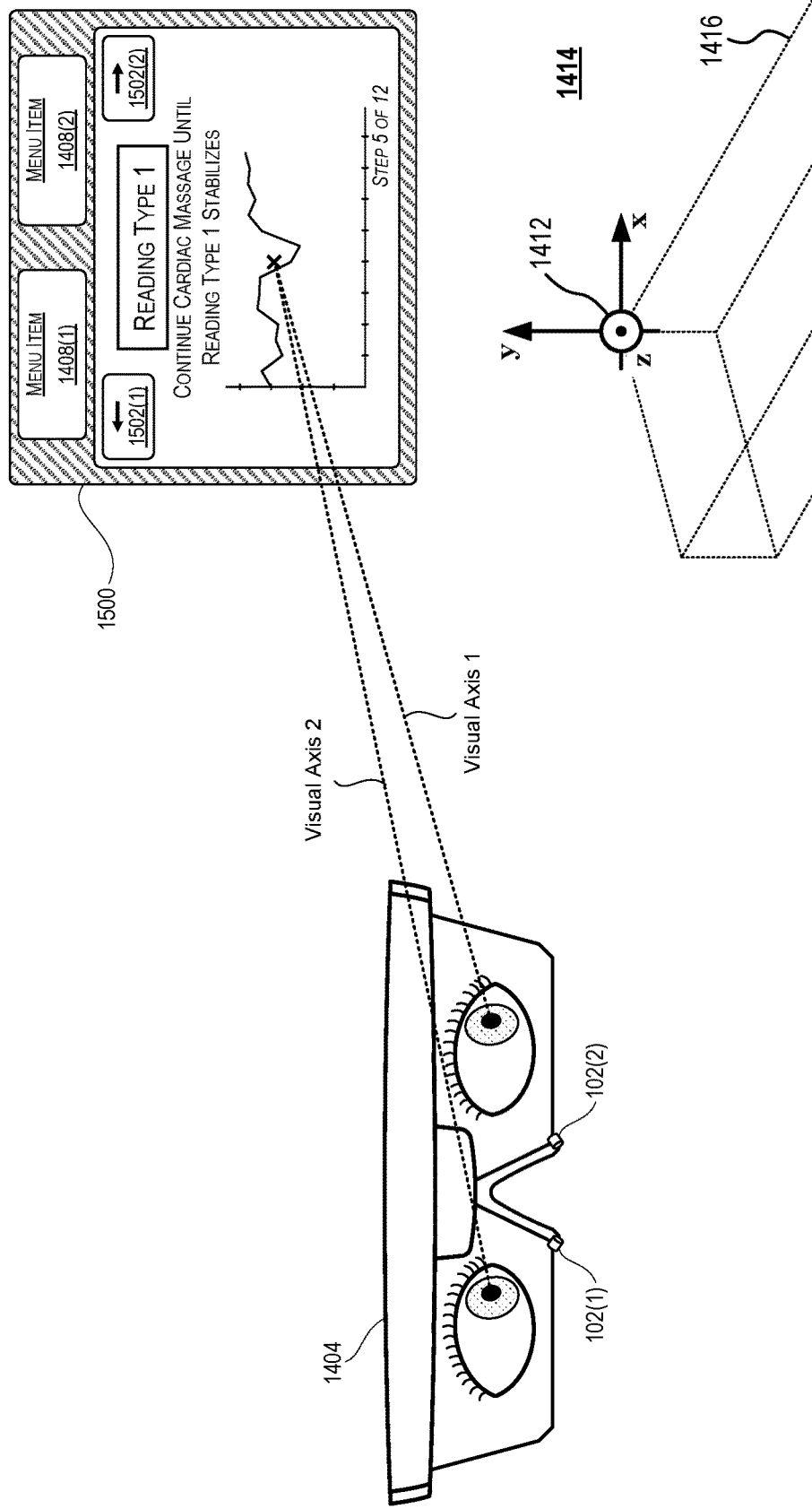
FIG. 15D is similar to FIG. 15C with the exception that the virtual scene has been adjusted in response to the combination of user gaze direction and facial gesture shown in FIG. 15C.

Turning now to FIG. 15D, this drawing is similar to FIG. 15C with the exception that the virtual scene 1500 has been adjusted in response to the combination of user gaze direction and facial gesture shown in FIG. 15C. Specifically, the virtual scene 1500 has stopped rendering the fourth step and is now rendering the fifth step which is to "continue cardiac massage until reading type 1 stabilizes." Moreover, the user gaze direction has changed from being directed toward the "next step" button 1502(2) to being directed at a dynamic graphical readout that represents the reading type 1. It can be appreciated that under a variety of circumstances, a person may wish to adjust the type of information being displayed but is unable to use their hands to do so. For example, in the present example, the surgeon cannot use his or her hands to provide the traditional types of hand gesture input that some conventional NED device are configured to receive because doing so would interrupt the cardiac massage.

Figure 15E:
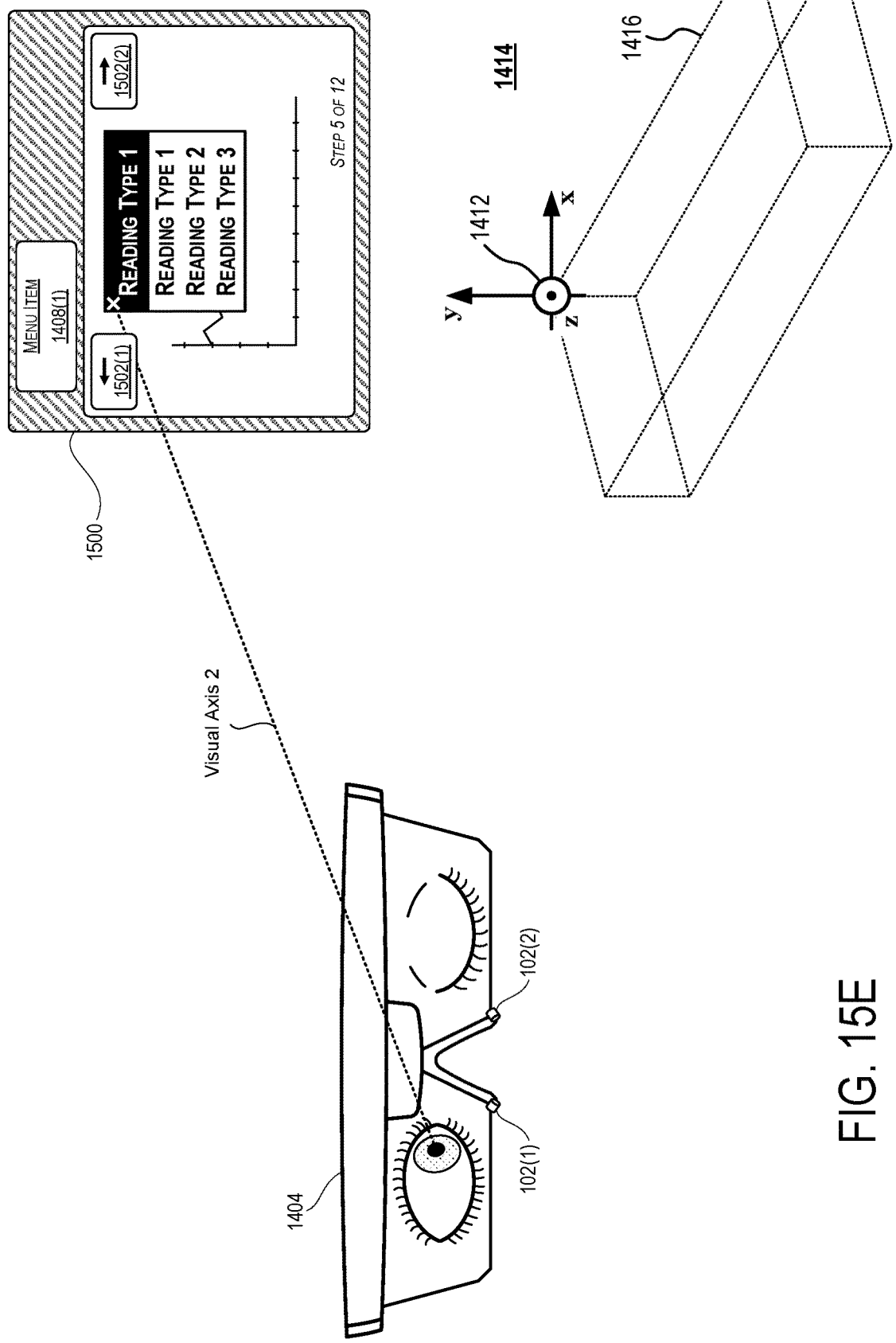
FIG. 15E is similar to FIG. 15D with the exception that the user's gaze direction has been focused onto a particular graphical element just prior to the user deliberately performing a particular blinking gesture.

Turning now to FIG. 15E, this drawing is similar to FIG. 15D with the exception that the user's gaze direction has been focused onto a particular graphical element just prior to the user deliberately performing a particular blinking gesture. Specifically, the user is deliberately blinking his or her right eye while retaining focus a "reading type" graphical element. For purposed of the present discussion of FIGS. 15A through 15E, presume that the combination of focusing on a particular graphical element and then deliberately blinking a right eye is interpreted by the NED device 1404 similarly to how a WINDOWS-based operating system would interpret hovering a mouse curser over the particular graphical element and then clicking a right mouse button (i.e., on a physical hardware mouse). In this example, the NED device 1404 is shown as responding to the illustrated facial gesture/gaze direction combination by exposing to the user a contextual menu (e.g., a drop-down menu) that includes a plurality of different individually selectable graphical elements. This enables the user to focus on any one of the graphical elements and then perform a deliberate facial gesture to select the focused on graphical element.

Based on the foregoing description of FIGS. 14 through 15E, it should be appreciated that the described technologies represent a substantial advancement over conventional NED devices which are unable to receive "hands-free" user input instructions other than voice-based commands. For example, the NED device 1404 enables users to provide "hands-free" user input instructions to adjust what type of information is currently being rendered, adjust the format with which information is currently being rendered, and so on. The NED device 1404 is usable in a variety of real-life practical applications that include, but are not limited to, scenarios where users are performing hand intensive tasks that render conventional hand gestures impractical. The disclosed techniques therefore represent a substantial advance toward providing users with "hands-free" control over deeply immersive augmented-reality (AR) content.

Figure 16:
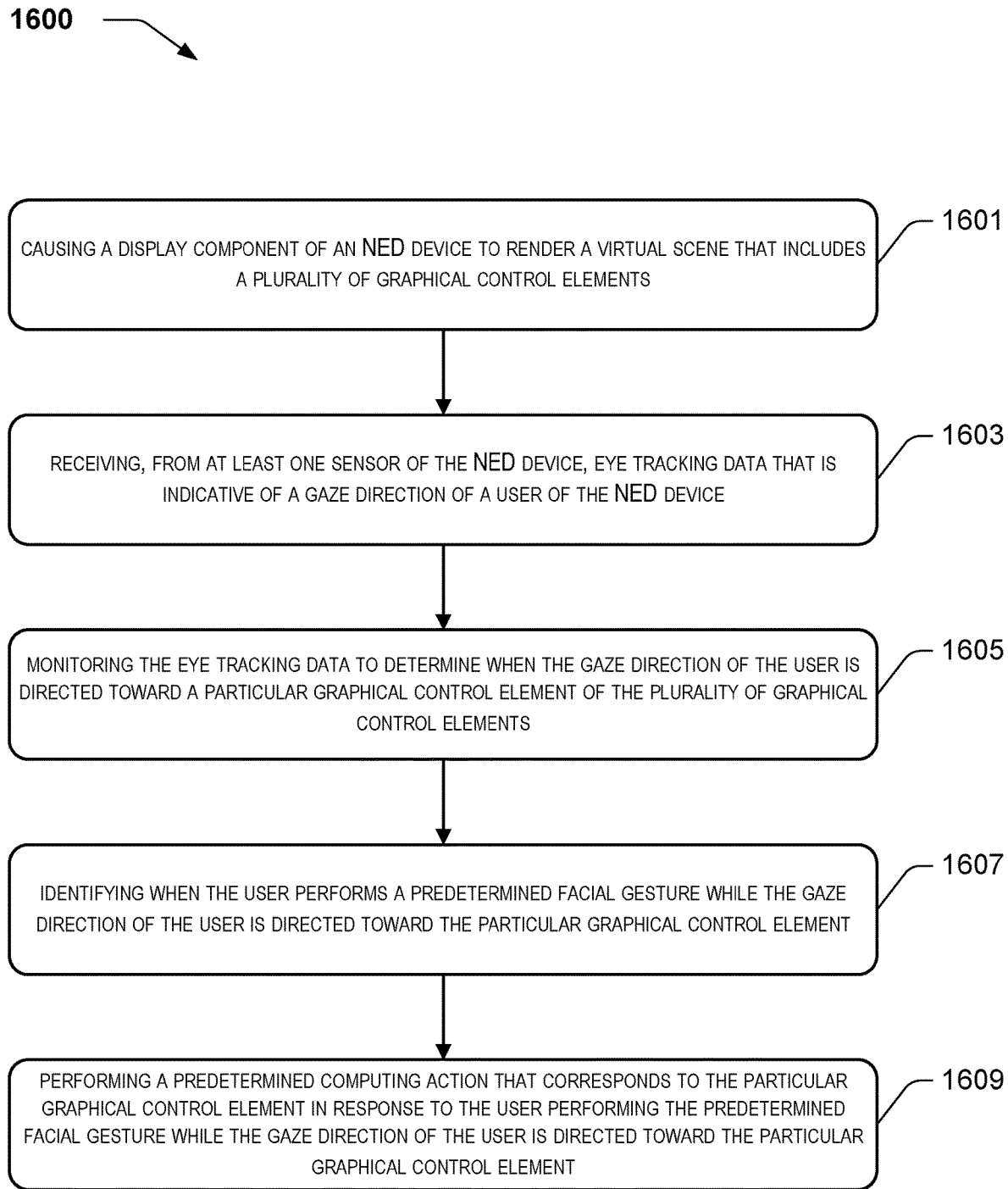
FIG. 16 is a flow diagram of a process to translate combinations of user gaze direction and predetermined facial gestures into user input instructions for a Near-Eye-Display (NED) device.

Turning now to FIG. 16, illustrated is a flow diagram of a process 1600 to translate combinations of user gaze direction and predetermined facial gestures into user input instructions for a Near-Eye-Display (NED) device.

At block 1601, the NED device causes a display component to render a virtual scene that includes a plurality of graphical control elements. Although an exemplary virtual scene is shown and described in relation to FIGS. 14 through 15E, these details are provided for explanatory purposes only and are not to be construed as limiting. Rather, the techniques described herein are applicable to a wide array of other virtual scenes. In some examples, the virtual scene may be a folder-based operating system interface that enables a user to navigate through a directory structure to view, open, move, copy, and/or delete contents of various folders of the directory structure.

At block 1603, the NED device receives eye tracking data from at least one sensor. As described in more detail above, the eye tracking data is indicative of a gaze direction of the user that is wearing the NED device. In some embodiments, the gaze direction may be determined by the NED device using various techniques described above in relation to the ocular rotation model. For example, the eye tracking data may be images of the user's pupils and/or irises that appear elliptical due to the sensors being angularly offset from the optical axis of the eyes. Additionally, or alternatively, the gaze directed may be determined by eye tracking systems that relies on illuminating the eye(s) with near infrared light to cause first Purkinje reflections (e.g., "glints") that are distributed around the iris, the techniques disclosed herein do not require active emission of near infrared light toward the user's eyes.

At block 1605, the NED device monitors the eye tracking data to determine when the gaze direction of the user is directed toward a particular graphical control element of the plurality of graphical control elements. For example, if the NED device may determine when the user is focusing his or her attention on a "next step" button that is being rendered within the user's field of view. In some embodiments, determining that the user is focused on a particular graphical control element is based on a determination that a vergence point between the user's two visual axis is located on the particular graphical control element.

At block 1607, the NED device determines when the user performs a predetermined facial gesture while the gaze direction of the user is directed toward the particular graphical control element. As a specific example, the NED device may determine when the user performs a single deliberate blink while the gaze direction of the user is directed toward the particular graphical control element. Since human anatomy causes a typical person to blink several thousand times a day spontaneously and/or reflexively, it can be appreciated that implementations of the techniques described herein may benefit from distinguishing between deliberate facial gestures (which a user may intentionally perform for the purpose of provide a user input instruction) and spontaneous and/or reflexive facial gestures (which a user may perform unintentionally without any desire to provide user input instructions). Stated more plainly, in some embodiments the NED device may filter out unintentional facial gestures.

In some embodiments, the NED device may distinguish deliberate facial gestures from involuntary facial gestures based on a variety of factors. For example, the NED device may distinguish a deliberate blink from an involuntary blink based on a duration of time over which the blink occurs. To further illustrate, suppose that a particular user has undergone a calibration process with the NED device during which the user is periodically prompted to deliberately perform a predetermined facial gesture. During the calibration period, the user may also perform the predetermined facial gesture inadvertently numerous times. For example, during a one-minute calibration period the user may be prompted to blink her left eye four times while during the same one-minute calibration period the use may blink involuntarily on average once every four seconds. In this example, the NED device may observe from the calibration session that each deliberate blink lasted between 0.75 seconds and 1.25 seconds. The NED device my further observe from the calibration session that each involuntary blink lasted no more than 0.15 seconds. Under these circumstances, the NED device may filter out blink gestures that last less than some predetermined duration of time such as, for example, 0.75 seconds, 0.5 seconds, 0.25 seconds, or any other suitable duration.

At block 1609, the NED device performs a predetermined computing action that corresponds to the particular graphical control element in response to the combination of the user gazing at (e.g., focusing on) the particular graphical control element while concurrently performing the predetermined facial gesture. For example, continuing with the example of the particular graphical control element being the "next step" button as described herein in relation to FIG. 15C, the combination of gazing at and blinking on the particular graphical control element may cause the NED device to advance to a next page within a sequence of pages.

EXAMPLE CLAUSES

Example Clause A, a Near-Eye-Display (NED) device, comprising: at least one sensor configured to generate eye tracking data associated with at least one eye of a user; at least one display component configured to generate a virtual scene within a field of view of the user; one or more processors; and at least one computer storage medium having computer executable instructions stored thereon which are executable by the one or more processors to: cause the at least one display component to render at least one graphical element within the virtual scene; receive the eye tracking data from the at least one sensor; monitor, based on the eye tracking data, a gaze direction of the user to determine when the user is focusing on the at least one graphical element within the virtual scene; identify when a predetermined facial gesture is performed by the user while the user is focusing on the at least one graphical element within the virtual scene; and in response to the predetermined facial gesture being performed by the user while the user is focusing on the at least one graphical element within the virtual scene, perform a predetermined computing action in association with the at least one graphical element.

Example Clause B, the NED device of Example Clause A, wherein the computer executable instructions are further executable by the one or more processors to filter out involuntary facial gestures based on a predetermined duration of time.

Example Clause C, the NED device of any one of Example Clauses A through B, wherein the computer executable instructions are further executable by the one or more processors to identify the predetermined facial gesture based at least in part on a sequential disappearance and reappearance of at least one of glints or substantially circular features.

Example Clause D, the NED device of any one of Example Clauses A through C, wherein the predetermined facial gesture is defined as an occurrence of two blinks of a left eye of the user within a threshold period of time.

Example Clause E, the NED device of any one of Example Clauses A through D, wherein the predetermined facial gesture is defined as a predetermined number of blinks of a predetermined eye occurring within a threshold period of time.

Example Clause F, the NED device of any one of Example Clauses A through E, wherein the computer executable instructions are further executable by the one or more processors to cause the at least one display component to render a graphical indicator that indicates a current location within the virtual scene at which the gaze direction of the user is directed toward.

Example Clause G, the NED device of any one of Example Clauses A through F, wherein performing the predetermined computing action in association with the at least one graphical element is based on the predetermined facial gesture being performed while the graphical indicator is being displayed as hovering over the at least one graphical element.

Example Clause H, the NED device of any one of Example Clauses A through G, wherein the computer executable instructions are further executable by the one or more processors to cause the at least one display component to dynamically adjust a rendering of the at least one graphical element within the virtual scene in response to determining that the user is focusing on the at least one graphical element within the virtual scene.

Example Clause I, a computer-implemented method for translating combinations of user gaze direction and predetermined facial gestures into user input instructions for a Near-Eye-Display (NED) device, the method comprising: causing at least one display component of the NED device to render a virtual scene that includes a plurality of graphical control elements; receiving, from at least one sensor of the NED device, eye tracking data that is indicative of a gaze direction of a user of the NED device; monitoring the eye tracking data to determine when the gaze direction of the user is directed toward a particular graphical control element of the plurality of graphical control elements; identifying when the user performs a predetermined facial gesture while the gaze direction of the user is directed toward the particular graphical control element; and performing a predetermined computing action that corresponds to the particular graphical control element in response to the user performing the predetermined facial gesture while the gaze direction of the user is directed toward the particular graphical control element.

Example Clause J, the computer-implemented method of Example Clause I, wherein identifying when the user performs the predetermined facial gesture includes determining whether the predetermined facial gesture is performed deliberately based on a duration of the predetermined facial gesture lasting at least a predetermined duration of time.

Example Clause K, the computer-implemented method of any one of Example Clauses I through J, wherein performing the predetermined computing action includes exposing a contextual menu corresponding to the particular graphical control element in response to the user performing the predetermined facial gesture while the gaze direction of the user is directed toward the particular graphical control element.

Example Clause L, the computer-implemented method of any one of Example Clauses I through K, wherein performing the predetermined computing action includes advancing the virtual scene from a current page to a next page in response to the user performing the predetermined facial gesture while the gaze direction of the user is directed toward the particular graphical control element.

Example Clause M, the computer-implemented method of any one of Example Clauses I through L, wherein the predetermined facial gesture is defined as an occurrence of two blinks of a predetermined eye of the user within a threshold period of time.

Example Clause N, the computer-implemented method of any one of Example Clauses I through M, wherein the predetermined facial gesture is defined as a predetermined number of blinks of a predetermined eye occurring within a threshold period of time.

Example Clause O, a computing system, comprising: one or more processors; and at least one computer storage medium having computer executable instructions stored thereon which are executable by the one or more processors to: cause at least one display component to render a plurality of graphical control elements; receive, from at least one sensor, eye tracking data that is indicative of a gaze direction of a user; monitor the eye tracking data to determine when the gaze direction of the user is directed toward a particular graphical control element; determine when the user performs a predetermined facial gesture; and perform a predetermined computing action that corresponds to the particular graphical control element in response to: the gaze direction of the user being directed toward the particular graphical control element, and the user performing the predetermined facial gesture.

Example Clause P, the computer-implemented method of Example Clause O, wherein the computer executable instructions are further executable by the one or more processors to cause the at least one display component to render a graphical indicator based on the gaze direction, and wherein performing the predetermined computing action is based on the predetermined facial gesture being performed while the graphical indicator is being displayed as hovering over the particular graphical control element.

Example Clause Q, the computer-implemented method of any one of Example Clauses O through P, wherein the predetermined facial gesture is defined as an occurrence of two blinks of a left eye of the user within a threshold period of time.

Example Clause R, the computer-implemented method of any one of Example Clauses O through Q, wherein the predetermined facial gesture is defined as a predetermined number of blinks of a predetermined eye occurring within a threshold period of time.

Example Clause S, the computer-implemented method of any one of Example Clauses O through R, wherein the computer executable instructions are further executable by the one or more processors to determine that the predetermined facial gesture is deliberately performed.

Example Clause T, the computer-implemented method of any one of Example Clauses O through S, wherein the user performing the predetermined facial gesture occurs while the gaze direction of the user remains directed toward the particular graphical control element.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A Near-Eye-Display (NED) device, comprising:
   at least one sensor configured to generate eye tracking data associated with at least one eye of a user;
   at least one display component configured to generate a virtual scene within a field of view of the user;
   one or more processors; and at least one computer storage medium having computer executable instructions stored thereon which are executable by the one or more processors to:

cause the at least one display component to render the virtual scene at a location that is anchored with respect to a workspace within a real-world environment, wherein the virtual scene includes at least one graphical element that is selectable to adjust a type of information being displayed within the virtual scene in association with a task being performed within the workspace;

receive the eye tracking data from the at least one sensor;

monitor, based on the eye tracking data, a gaze direction of the user to determine when the user is focusing on the at least one graphical element within the virtual scene;

identify when a predetermined facial gesture is performed by the user while the user is focusing on the at least one graphical element within the virtual scene; and in response to the predetermined facial gesture being performed by the user while the user is focusing on the at least one graphical element within the virtual scene that is anchored with respect to the workspace, adjust the type of information being displayed within the virtual scene in association with the task being performed within the workspace.

2. The NED device of claim 1, wherein the computer executable instructions are further executable by the one or more processors to filter out involuntary facial gestures based on a predetermined duration of time.

3. The NED device of claim 1, wherein the computer executable instructions are further executable by the one or more processors to identify the predetermined facial gesture based at least in part on a sequential disappearance and reappearance of at least one of glints or substantially circular features.

4. The NED device of claim 1, wherein the predetermined facial gesture is defined as an occurrence of two blinks of a left eye of the user within a threshold period of time.

5. The NED device of claim 1, wherein the predetermined facial gesture is defined as a predetermined number of blinks of a predetermined eye occurring within a threshold period of time.

6. The NED device of claim 1, wherein the computer executable instructions are further executable by the one or more processors to cause the at least one display component to render a graphical indicator that indicates a current location within the virtual scene at which the gaze direction of the user is directed toward.

7. The NED device of claim 6, wherein performing the predetermined computing action in association with the at least one graphical element is based on the predetermined facial gesture being performed while the graphical indicator is being displayed as hovering over the at least one graphical element.

8. The NED device of claim 1, wherein the computer executable instructions are further executable by the one or more processors to cause the at least one display component to dynamically adjust a rendering of the at least one graphical element within the virtual scene in response to determining that the user is focusing on the at least one graphical element within the virtual scene.

9. A computer-implemented method for translating combinations of user gaze direction and predetermined facial gestures into user input instructions for a Near-Eye-Display (NED) device, the method comprising:

causing at least one display component of the NED device to render a virtual scene that is anchored with respect to a workspace within a real-world environment, wherein the virtual scene includes a plurality of graphical control elements that are selectable to adjust a type of information being displayed within the virtual scene in association with a task being performed within the workspace;

receiving, from at least one sensor of the NED device, eye tracking data that is indicative of a gaze direction of a user of the NED device;

monitoring the eye tracking data to determine when the gaze direction of the user is directed toward a particular graphical control element of the plurality of graphical control elements, that corresponds to a particular type of information that is associated with the task being performed within the workspace;

identifying when the user performs a predetermined facial gesture while the gaze direction of the user is directed toward the particular graphical control element; and in response to the user performing the predetermined facial gesture while the gaze direction of the user is directed toward the particular graphical control element, causing the at least one display component to dynamically adjust the virtual scene to render the particular type of information.

10. The computer-implemented method of claim 9, wherein identifying when the user performs the predetermined facial gesture includes determining whether the predetermined facial gesture is performed deliberately based on a duration of the predetermined facial gesture lasting at least a predetermined duration of time.

11. The computer-implemented method of claim 9, wherein performing the predetermined computing action includes exposing a contextual menu corresponding to the particular graphical control element in response to the user performing the predetermined facial gesture while the gaze direction of the user is directed toward the particular graphical control element.

12. The computer-implemented method of claim 9, wherein performing the predetermined computing action includes advancing the virtual scene from a current page, of step-by-step instructions associated with the task, to a next page, of the step-by-step instructions associated with the task, in response to the user performing the predetermined facial gesture while the gaze direction of the user is directed toward the particular graphical control element.

13. The computer-implemented method of claim 9, wherein the predetermined facial gesture is defined as an occurrence of two blinks of a predetermined eye of the user within a threshold period of time.

14. The computer-implemented method of claim 9, wherein the predetermined facial gesture is defined as a predetermined number of blinks of a predetermined eye occurring within a threshold period of time.

15. A computing system, comprising:
one or more processors; and
at least one computer storage medium having computer executable instructions stored thereon which are executable by the one or more processors to:
cause at least one display component to render a virtual scene at a location that is anchored with respect to a workspace within a real-world environment, wherein the virtual scene includes a plurality of graphical control elements that are selectable to dynamically adjust a type of information being displayed within the virtual scene in association with a task being performed within the workspace;

receive, from at least one sensor, eye tracking data that is indicative of a gaze direction of a user;

monitor the eye tracking data to determine when the gaze direction of the user is directed toward a particular graphical control element that corresponds to a particular type of information associated with the task being performed within the workspace;

determine when the user performs a predetermined facial gesture; and in response to the user performing the predetermined facial gesture while the gaze direction of the user being directed toward the particular graphical control element, cause the at least one display component to adjust the virtual scene to include the particular type of information.

16. The computing system of claim 15, wherein the computer executable instructions are further executable by the one or more processors to cause the at least one display component to render a graphical indicator based on the gaze direction, and wherein performing the predetermined computing action is based on the predetermined facial gesture being performed while the graphical indicator is being displayed as hovering over the particular graphical control element.

17. The computing system of claim 15, wherein the predetermined facial gesture is defined as an occurrence of two blinks of a left eye of the user within a threshold period of time.

18. The computing system of claim 15, wherein the predetermined facial gesture is defined as a predetermined number of blinks of a predetermined eye occurring within a threshold period of time.

19. The computing system of claim 15, wherein the computer executable instructions are further executable by the one or more processors to determine that the predetermined facial gesture is deliberately performed.

20. The computing system of claim 15, wherein the user performing the predetermined facial gesture occurs while the gaze direction of the user remains directed toward the particular graphical control element.

* * * * *